(12) United States Patent
Carrie et al.

(10) Patent No.: US 8,442,885 B1
(45) Date of Patent: May 14, 2013

(54) ALGORITHMIC TRADING MANAGEMENT SYSTEM AND METHOD

(75) Inventors: Carl Carrie, Manhasset Hills, NY (US); Deepak Nautiyal, Princeton Junction, NJ (US); Jarrett Sydell, White Plains, NY (US); Bryce Byers, Orem, UT (US); Greg Cook, Salem, UT (US)

(73) Assignee: JPMorgan Chase Bank, N.A., New York, NY (US)

( * ) Notice: Subject to any disclaimer, the term of this patent is extended or adjusted under 35 U.S.C. 154(b) by 1016 days.

(21) Appl. No.: 12/365,451

(22) Filed: Feb. 4, 2009

Related U.S. Application Data

(60) Provisional application No. 61/028,614, filed on Feb. 14, 2008.

(51) Int. Cl.
*G06Q 40/00* (2012.01)
(52) U.S. Cl.
USPC .............................................. 705/35; 705/37
(58) Field of Classification Search ............... 705/35–45
See application file for complete search history.

(56) References Cited

U.S. PATENT DOCUMENTS 6,766,304 B2 * 7/2004 Kemp et al. ................. 705/36 R

OTHER PUBLICATIONS

Climbing the Algorithmic Learning Curve, Wall Street & Technology, Aug. 27, 2004 http://www.wallstreetandtech.com/trading-technology/climbing-the-algorithmic-learning-curve/42700086.*
Automated and Algorithmic Trading, http://www.portware.com/flash/files/what-do-you-want/automated-trading.html, Jun. 22, 2012, 1 page.
Neovest's Do-It-Yourself Algo Revolution, The Street's First Algorithmic Management System, Nina Mehta, Traders Magazine, Oct. 2007, 2 pages, http://www.tradersmagazine.com/issues/20071004/2932-1.html, Jun. 22, 2012.
Cover Story: Converge & Diverge, EMS Suppliers Vie to Distinguish Themselves as Their Products Become Increasingly Similar, Peter Chapman, Traders Magazine, Apr. 2011. 4 pages, http://www.tradersmagazine.com/issues/24_321/ems-nangalia-woodbine-realtick-107422-1.html, Jun. 22, 2012.
FlexTRADER, Portfolio Trading Application, 2 pages, http://www.flextrade.com/solutions/ems/flextrader, Jun. 22, 2012.
A Program Trading Weapons Race, Brokers and Vendors Launch More User Products and Services, Peter Chapman, Traders Magazine, Mar. 2004, 3 pages, http://www.tradersmagazine.com/issues/20040331/1879-1.html, Jun. 22, 2012.
The Algorithmic Aggregator, Peter Chapman, Traders Magazine, Nov. 2004, 3 pages, http://mvw.tradersmagazine.com/issues/20041130/2090-1.html, Jun. 22, 2012.

* cited by examiner

*Primary Examiner* — Richard C Weisberger
(74) *Attorney, Agent, or Firm* — Goodwin Procter LLP

(57) ABSTRACT

Embodiments of the invention are directed to a computer-implemented system and method for facilitating electronic market participation of traders. The algorithmic trading management system may comprise an algorithm and/or sequence usage and construction module providing conditional user interface features for allowing traders to construct algorithms or sequences to structure trading orders. The system may additionally include sequence modification components for allowing traders to modify algorithms collected from external sources in order to customize trading orders. The system may further include operator intervention tools for allowing traders to manually influence sequence execution through a user interface.

11 Claims, 32 Drawing Sheets

| BrokerBuy Confirm: MSFT | | | | | |
|---|---|---|---|---|---|
| Buy | Size 100 | Price 28.07 | Broker Destination | Broker Strategy | Instruction TEST Joe grasia |

Please select Destination.

| Aggregation Group Position | Currency & Security ID | Target Management |
|---|---|---|

[ Send ]  [ Cancel ]

FIG 30

ALGORITHMIC TRADING MANAGEMENT SYSTEM AND METHOD

PRIORITY

This application claims priority from provisional application Ser. No. 61/028,614, filed on Feb. 14, 2008.

TECHNICAL FIELD

Embodiments of the invention are related generally to systems and methods for managing electronic trading performed through the use of algorithms in order to formulate and execute orders.

BACKGROUND OF THE INVENTION

In financial markets, electronic trading is a mode of trading that uses information technology to bring together a buyer and a seller through technology in order to create a virtual marketplace. Many investment firms on both the buy and sell side are increasing their investment in systems and technology for electronic trading. Traders are increasingly relying on algorithms to analyze market conditions and execute orders.

Algorithmic trading involves the use of computer programs for entering trading orders. The computer programs may be written to make decisions regarding trading orders including timing, price, and quantity decisions.

Participants in electronic financial markets typically include hedge funds, pension funds, mutual funds and other institutional traders. Through electronic financial markets, these traders are able to make decisions to initiate orders based on electronically received information that in some instances may be available electronically before it is available to human traders. Furthermore, algorithmic trading facilitates division of large trades into multiple smaller trades in order to manage cost and risk.

Using algorithmic trading, large traders may split orders to execute each order or category of orders at a better average price. These average price benchmarks may be measured and calculated through the use of one or more of many available algorithms, for example, through the use of algorithms calculating a time weighted average price (TWAP) or volume weighted average price (VWAP).

The trading systems used by traders for algorithmic trading are often referred to as Execution Management Systems (EMS) or Order Management Systems (OMS). Either of these types of systems may be capable of connecting with multiple algorithmic providers in order to allow access to a large set of algorithms and may be used for electronic trading of equities, futures, options, and FX.

Traders may find algorithms and other tools offered by different brokers that are useful for specific situations in accordance with objectives of portfolio managers. Objectives may include making a predetermined purchase, minimizing timing risk, minimizing market risk, a combination of these objectives, or other objectives. Traders, in order to accomplish pre-defined objectives, aim to construct sequences of these available algorithms and/or other tools.

In order to accommodate the needs of traders, various companies, such as Flextrade™ and Portware™ offer packages that enable traders to have access to multiple algorithms and to build their own algorithms. Similarly, Progressive Software offers Apama™, which is an event processing system outside of the financial realm that operates in a manner similar to Portware™. However, the packages provided by these companies require staffing of programmers in order to create and customize the algorithms. The programmers must interact with traders in order to determine the required level of customization and the traders can use the tools provided through these packages only after the traders' needs are addressed by the programmers.

An additional difficulty with existing algorithmic trading systems is that the research and development costs to construct complex algorithmic order types and distribute them are often substantial. Multiple tasks are necessary for maintaining algorithmic systems. These systems require new coding sequences for each new order strategy. Buyers and sellers may want to switch algorithms based on market conditions, time, price, or other criteria. Furthermore, traders may develop their own algorithms that require coding for implementation. Over time, as a result of changing market conditions, traders may want to alter algorithmic parameters in order to revise their trading strategies. Thus, the cost of developing and maintaining algorithms may be high, especially for new entrants.

A solution is needed that simplifies customization of algorithmic trading strategies in order to allow traders to collect and modify algorithms from multiple brokers. Additionally, a solution is needed that allows traders to configure their own customized algorithms without the assistance of programmers.

BRIEF SUMMARY OF THE INVENTION

In one aspect of the invention, a computerized algorithmic trading management system is provided for facilitating electronic market participation of traders. The algorithmic trading management system comprises a sequence construction module providing conditional user interface features for allowing traders to construct combined algorithms and/or sequences to structure trading orders. The system additionally includes sequence modification components for allowing traders to modify algorithms collected from external sources or sequences built through the sequence construction module in order to customize trading orders and operator intervention tools for allowing traders to manually influence algorithm execution through a user interface.

In an additional aspect of the invention, an algorithmic trading management system for facilitating electronic market participation of traders is provided. The algorithmic trading management system comprises a sequence construction module for constructing trading algorithms and/or sequences having multiple parameters. The sequence construction module may include a time control engine for receiving trader input to regulate time parameters of an order generated by the algorithmic trading management system, a price control engine for receiving trader input to regulate price parameters of the order generated by the algorithmic trading management system, and an order control engine for receiving trader input to regulate order parameters of the order generated by the algorithmic trading management system. The system may additionally include monitoring components for monitoring external conditions related to the multiple parameters contained within the trading algorithms.

In an additional aspect of the invention, a method is provided for managing algorithmic trading in order to facilitate electronic market participation of traders. The method comprises providing a sequence construction module, the sequence construction module comprising conditional engines allowing trader input of parameters related to a trade in order to allow traders to produce customized algorithms and/or sequences. The method additionally includes collecting algorithms from external sources and receiving trader modifications to the collected algorithms to create modified algorithms. The method further includes rendering selected algorithms active, wherein the selected algorithms are selected by traders from the collected algorithms, the modified algorithms, and the customized algorithms. The method additionally includes monitoring external conditions in order to allow execution of orders in accordance with the selected algorithms.

BRIEF DESCRIPTION OF THE DRAWINGS

The present invention is described in detail below with reference to the attached drawings figures, wherein:

FIG. 21 illustrates a user interface for entering order parameters in accordance with an embodiment of the invention;

FIG. 22 illustrates a user interface allowing addition of conditions in accordance with an embodiment of the invention;

FIG. 23 illustrates a user interface displaying the added conditions in accordance with an embodiment of the invention;

FIG. 30 illustrates a confirmation user interface in accordance with an embodiment of the invention;

DETAILED DESCRIPTION OF PREFERRED EMBODIMENTS

Embodiments of the present invention are directed to an algorithmic trading management system for allowing electronic traders or any individual traders to create, save, and update customized algorithms. Furthermore, embodiments of the invention allow traders to modify existing algorithms in order to create a customized version of the existing algorithms. Embodiments of the invention additionally provide for monitoring of external parameters and automatic execution of defined algorithms based on values of the monitored external parameters, such as market parameters, as will be further described below.

Figure 1:
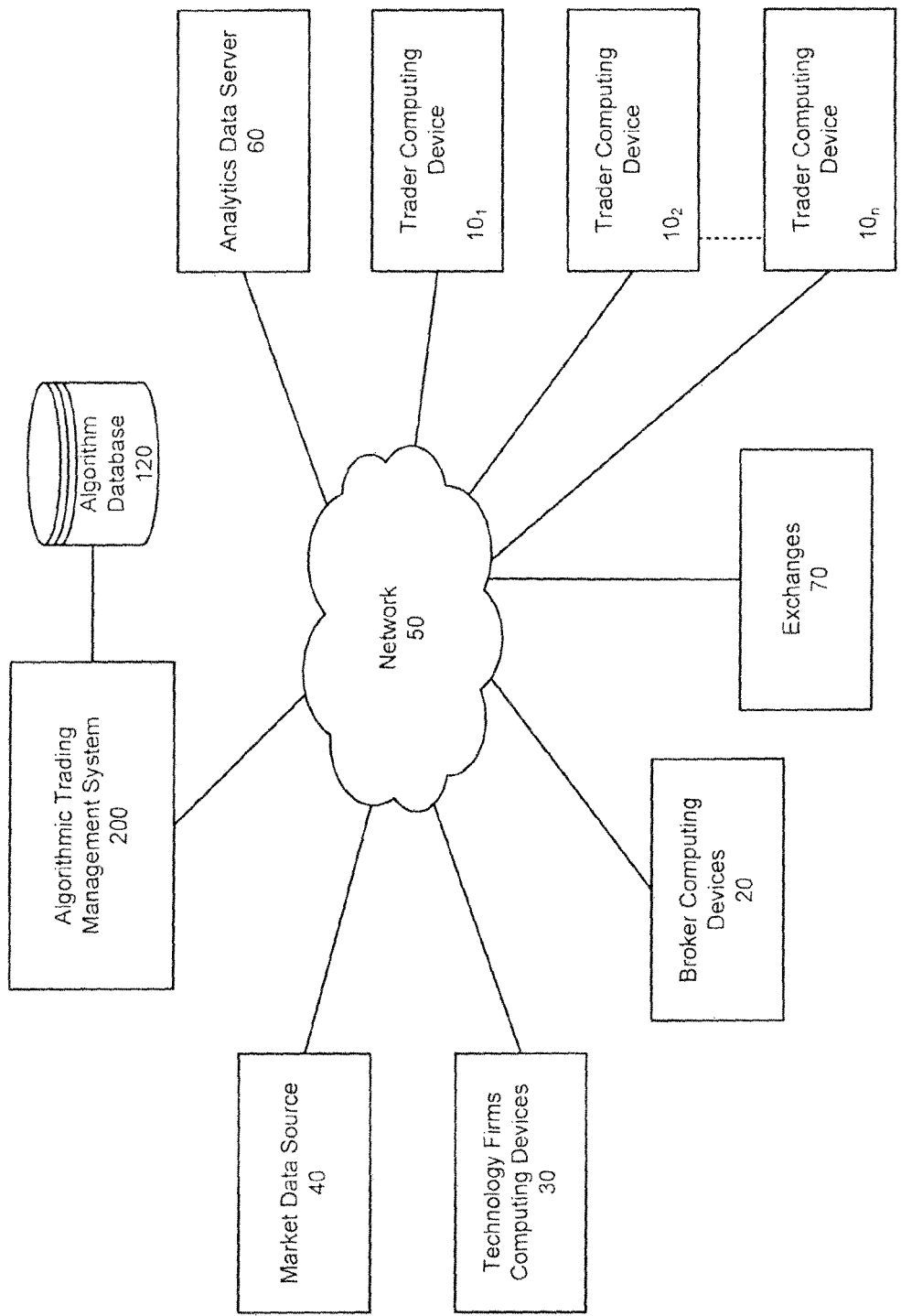
FIG. 1 is a block diagram illustrating an operating environment for an algorithmic trading management system in accordance with an embodiment of the invention.

FIG. 1 is a block diagram illustrating an operating environment for an algorithmic trading management system in accordance with an embodiment of the invention. An algorithmic trading management system 200 may be connected over a network 50 with trader computing devices $10_1$, $10_2$ ... $10_n$. Broker computing devices 20, technology firm computing devices 30, market data sources 40, and exchanges 70 may also be connected over the network 50 with the algorithmic trading management system 200. The algorithmic trading management system 200 may additionally access or incorporate an algorithm database 120 for storing existing algorithms. Additionally, an analytics data server 60 may be connected over the network 50 with the algorithmic trading management system 200 or may be otherwise accessible to the algorithmic trading management system 200.

Brokers 20 and technology firms 30 are able to provide existing algorithms for use by traders. In embodiments of the invention, the algorithmic trading management system 200 may gather algorithms from any number of brokers 20 and technology firms 30. The system 200 may be scaled in accordance with preferences to gather, for example, dozens, hundreds, thousands, or any other numbers of algorithms.

Through the algorithmic trading management system 200, traders 10 may be able to access systems such as exchanges 70, which may, for example, include traditional exchanges, electronic communication networks (ECNs), and dark pools. The environment illustrated in FIG. 1 is merely exemplary and the algorithmic trading management system 200 may be implemented in alternative environments. Trading orders may be related to multiple types of securities including options, currencies, equities, commodities, bonds, notes, or other types of instruments.

Market data source 40 and/or the analytic data server 60 may provide pricing and other market information in real time to the algorithmic trading management system 200. The market data source 40 may provide alerts to traders 10 regarding market conditions. Alternatively, the market data source 40 may monitor market conditions and automatically execute algorithms when the detected conditions match with user-specified algorithmic conditions, thereby causing orders to be directed to a user-specified destination.

The analytics data server 60 may be available to monitor changes in market events during the life cycle of an order. For example, the analytic data server 60 may report on a number of big blocks that have occurred during an order and period of time over which the change occurred. This information may be valuable in helping a user to determine whether to alter an order through the algorithmic trading management system 200. The market data evaluated may in some instances be determined internally and in other instances may be licensed from external sources. The market data collected may be used to achieve any number of goals including creation of indices for the system 200.

Figure 2:
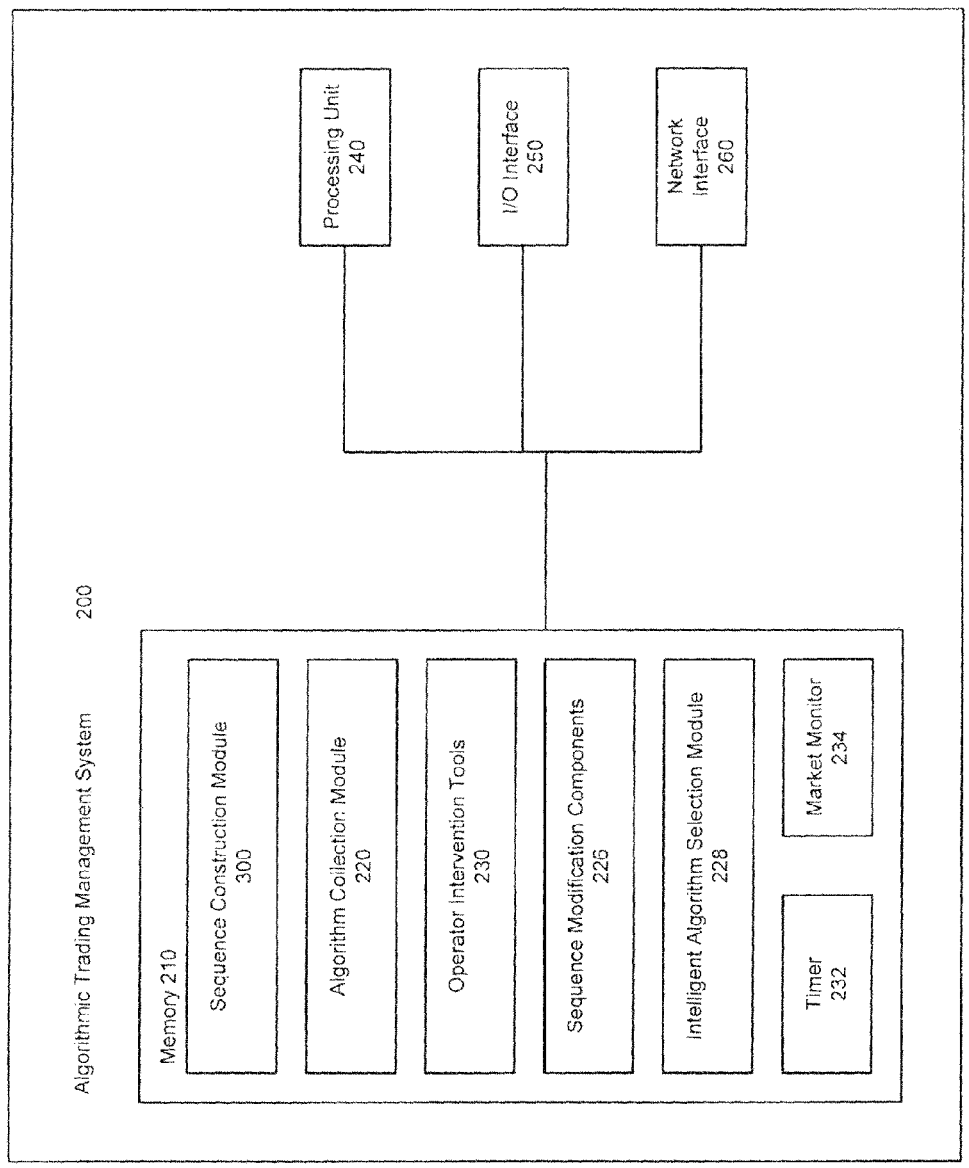
FIG. 2 is a block diagram illustrating an algorithmic trading management system in accordance with an embodiment of the invention.

FIG. 2 is a block diagram illustrating the algorithmic trading management system 200 in accordance with an embodiment of the invention. As illustrated in FIG. 2, the algorithmic trading management system may be incorporated in one or more computer systems. Various software modules may be stored in a memory 210. The various modules may include a sequence construction module 300, an algorithm collection module 220, an intelligent algorithm selection module 228, operator intervention tools 230, sequence modification components 226, a timer 232, and a market monitor 234. These components may be executed implementing a processing unit 240. The components and processing unit 240 may also be connected with interfaces such as an I/O interface 250 and network interface 260. Additional or alternative interfaces may also be implemented.

The sequence construction module 300 is described in greater detail with respect to FIG. 3 below. The algorithm collection module 220 may collect algorithms from various brokers and technology firms. A trader may have the capability to customize a UI in order to display algorithms available from preferred sources.

The algorithm selection module 228 may be implemented to intelligently analyze a trader's or system's historical algorithm use and to suggest appropriate algorithms based on historical patterns. Furthermore, the intelligent algorithm selection module 228 may suggest a sequence of algorithms based on trader patterns, market analysis, and historical data. The intelligent algorithm selection module 228 may further suggest appropriate destinations for routing based on its data analysis.

The operator intervention tools 230 may be used to interrupt or facilitate algorithm execution. The sequence modification components 226 may be implemented for algorithm and/or sequence modification. The modification components 226 may be implemented to modify pre-existing or newly created algorithms. Timer 232 and market monitor 234 may be used to monitor external conditions such as time and price, but may monitor other external conditions as required.

Figure 3:
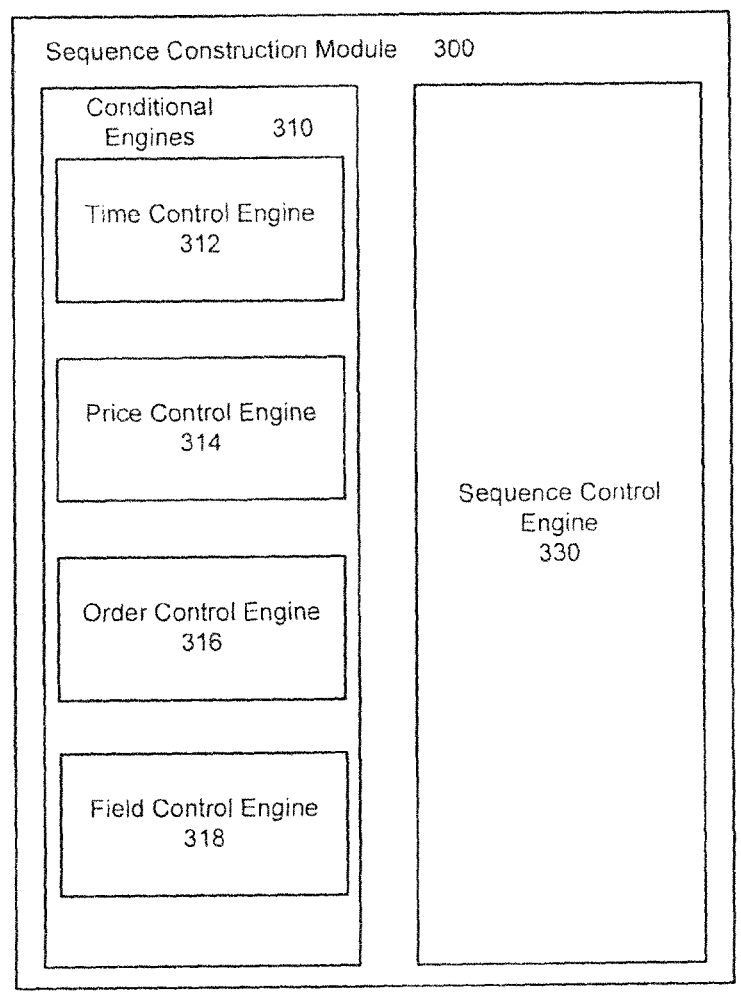
FIG. 3 is a block diagram illustrating a sequence construction module in accordance with an embodiment of the invention.

FIG. 3 is a block diagram illustrating the sequence construction module 300 in accordance with an embodiment of the invention. The sequence construction module 300 may include conditional engines 310, such as a time control engine 312, a price control engine 314, an order control engine 316, and a field control engine 318. The sequence construction module 300 may additionally include a sequence control engine 330.

The conditional engines 310 and the sequence control engine 330 are operable to manage construction of algorithms respecting user-selected conditions. Access to the conditional engines 310 and the sequence control engine 330 may be provided through an interactive UI, as will be further explained below.

The components shown in FIGS. 1-3 above may be or include a computer or multiple computers. The components may be described in the general context of computer-executable instructions, such as program modules, being executed by a computer. Generally, program modules include routines, programs, objects, components, data structures, etc. that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network, which may for example be or include a wireless network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BcOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The algorithmic trading management system 200 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm as may be desired. An encryption module may be used to encrypt data. Further, files or other data may be decrypted using a suitable decryption module.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface (UI) that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

Figure 4:
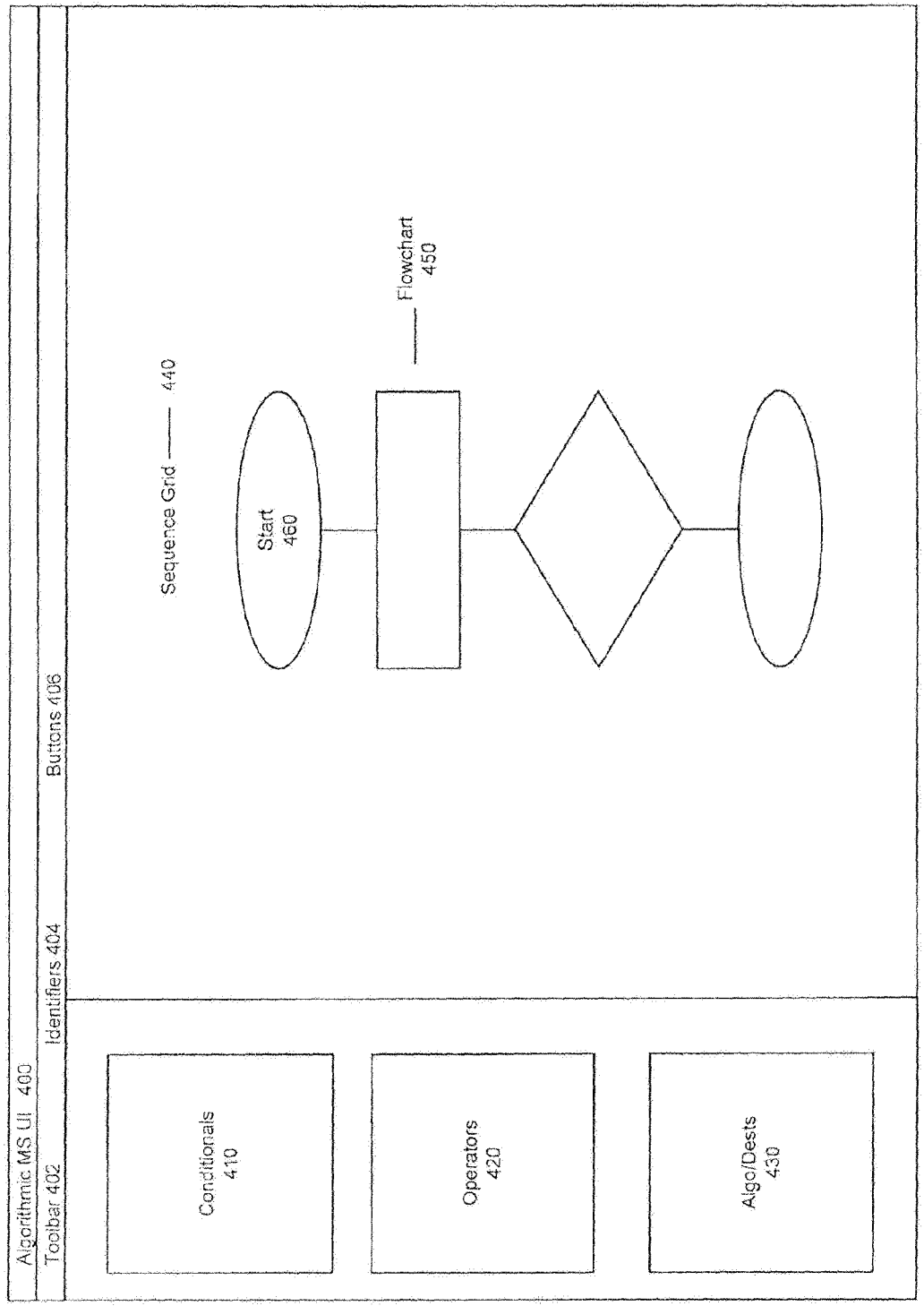
FIG. 4 is an illustration of an algorithmic management system user interface in accordance with an embodiment of the invention.

FIG. 4 is an illustration of an algorithmic management system UI 400 in accordance with an embodiment of the invention implementing the conditional engines and sequence control engine as described above. The UI 400 may include a toolbar 402. A left pane 408 may include conditionals 410, operators 420, and algorithms and destinations 430. The UI 400 may also include a sequence grid 440 which provides a visual representation or flowchart 450 of an algorithm sequence constructed using the conditionals 410, operators 420, and algorithms and destinations 430.

The items stored in the left pane 408 may dragged by a user into the sequence grid 440 for manipulation. The sequence grid 440 will graphically illustrates the parameters of the algorithm as manipulated by the user by providing flowchart 450. The sequence grid may include a start node 460. In embodiments of the invention, double clicking on the start node opens a dialog box that controls system handling of errors. Thus, through the start node and the generated dialog box, the user is able to define parameters in an error handling field.

Figure 5A:
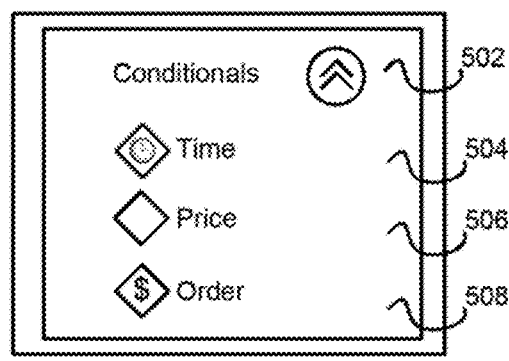
FIGS. 5A-C are user interface segments illustrating user interface tools in accordance with an embodiment of the invention.
Figure 5B:
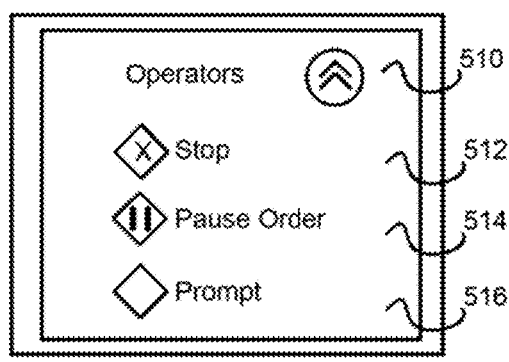
Figure 5C:
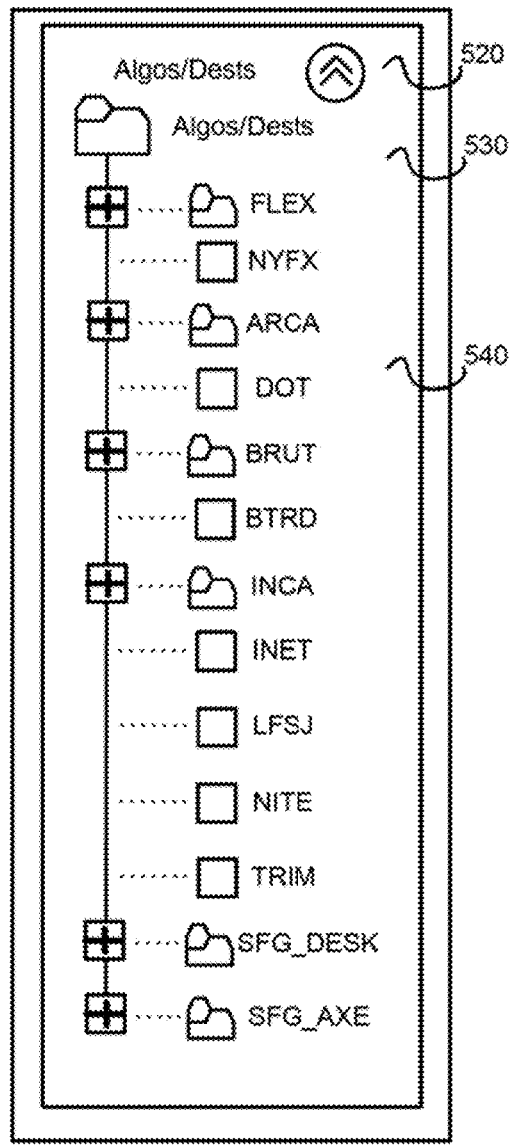

FIGS. 5A-C illustrate examples of conditionals, operators, and algorithms/destinations described in relation to FIG. 4 above. FIG. 5A illustrates conditionals nodes 502. The conditional nodes 502 may include for example, a time node 504, a price node 506, and an order node 508.

FIG. 5B illustrates operators 510. The operators 510 may include a stop operator 512, a pause order operator 514, and a prompt operator 516. The stop operator 512 will stop a sequence and cancel an active order in the market. The pause order operator 514 pauses a sequence, but keeps it running while canceling an active order in the market. The prompt operator 516 generates a visual prompt that requires user input. These operators 510 may be inserted into algorithms as will further be described below.

FIG. 5C illustrates algorithms and destinations 520 in accordance with an embodiment of the invention. A folder 530 may be provided containing the algorithms and destinations. Subfolders 540 may further be provided. Upon selecting subfolders 540, users may reach a level at which a drop down menu is displayed that includes selectable algorithms. Upon selecting an algorithm, the user may select a display option that allows selection of parameters for display after the order is sent.

Figure 32:
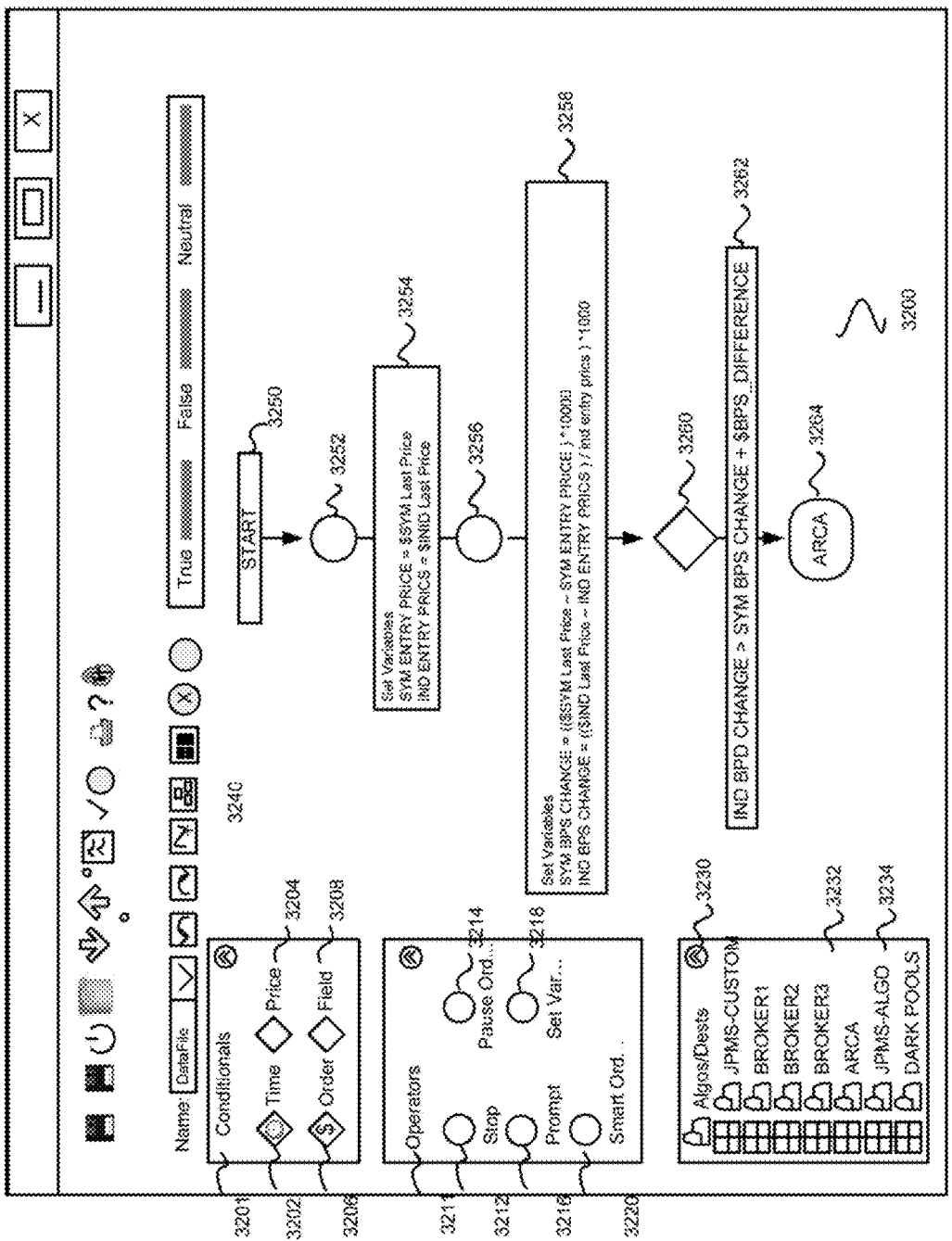
FIG. 32 is a screen shot illustrating an embodiment of the invention including additional conditional and operator nodes.

In an additional embodiment of the invention as illustrated by a screen shot 3200 in FIG. 32, additional conditional nodes 3201 and additional operator nodes 3211 may be included. Conditional nodes 3201 may include a time node 3202, a price node 3204, an order node 3206, and a field node 3208. Operator nodes 3211 may include a stop node 3212, a pause order operator 3214, a prompt operator 3216, a set variable operator 3218, and a smart order or shotgun operator 3220. The smart order or shotgun operator 3220 and the functionality associated with the operator will be further described below in connection with FIG. 34. The interface 3200 includes the algos/dests section 3230 including an algos/dests folder 3232 referencing multiple algorithms and destinations 3234 which operate as will be described in greater detail below.

In accordance with the example illustrated, a sequencing grid 3240 includes a start icon 3250, a function icon 3252, a set variables indicator 3254, a function icon 3256, and a set variables indicator 3258. In the illustrated example, the variables relate to a symbol traded and user defined index. An icon 3260 and divergence indicator 3262 illustrate that a divergence exists between the symbol traded and the user defined index. An icon 3264 may indicate release of an order due to the displayed divergence.

As illustrated in FIG. 32, the variable operator node 3218 allows a user to create dynamic formulas that can be used in a condition, such as price, time, order, and field, or in a route or destination.

Figure 33:
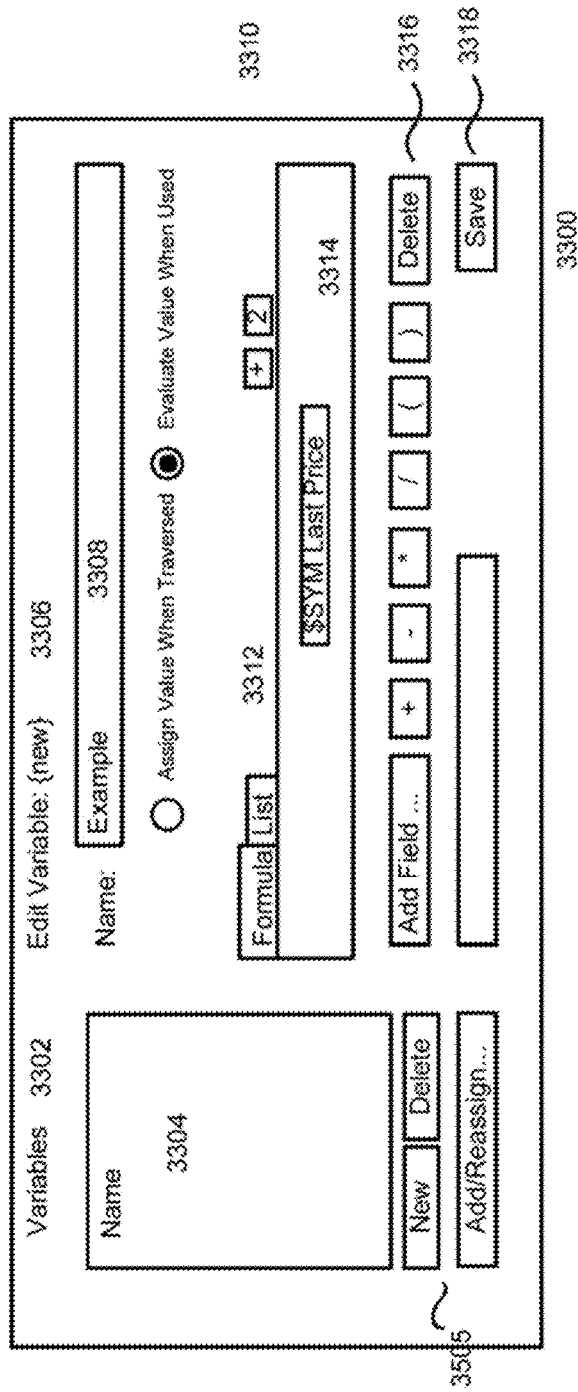
FIG. 33 is a screen shot illustrating variable node functionality in accordance with an embodiment of the invention.

FIG. 33 illustrates a specific configuration 3300 for the variable operator node. Variables 3302 may be listed at 3304. User actuated controls 3304 may allow addition, deletion, or reassignment of variables. An edit variable option 3306 may include a name blank 3308, options for evaluation 3310, formula and list tabs 3312 along with a descriptive portion 3314. Additional user actuated controls 3316 and 3318 allow for user manipulation. The options for evaluation 3310 may allow a user to control a calculation frequency and the formula tab 3312 may allow a user to control the specific formula being used. For example, if the frequency at 3310 is set to "Assign Value when Traversed", then the formula is only evaluated when the specific node is referenced. This functionality allows the user to create a snapshot of market events. The "Evaluate Value When Used" frequency will be used when the most current market data values are required for calculation.

Figure 35:
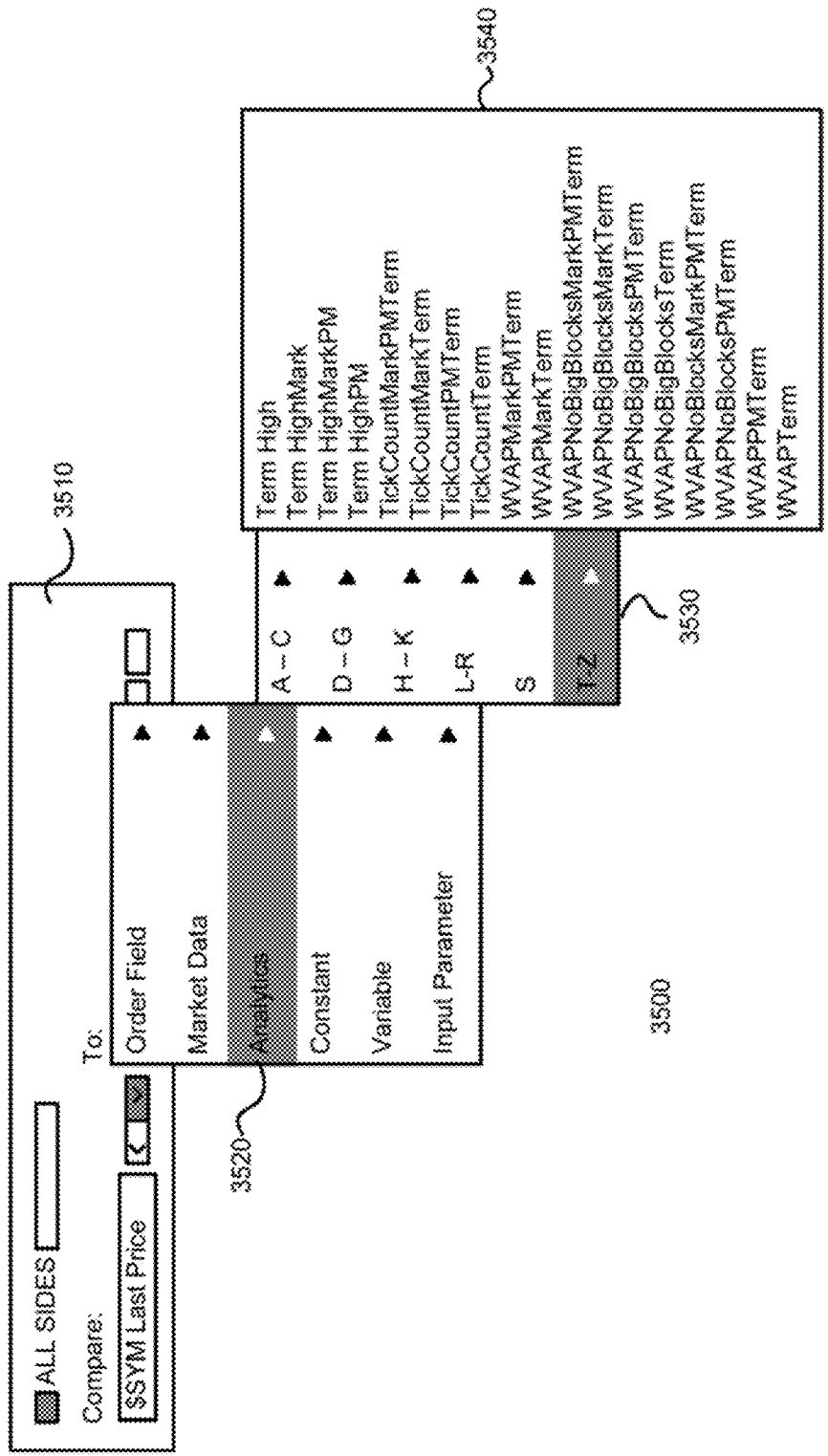
FIG. 35 is a screen shot illustrating a field node setup in accordance with an embodiment of the present invention.

FIG. 35 illustrates field node setup. A screen shot 3500 offers a comparison box 3510 including drop down menus 3520, 3530, and 3540. The drop down menu 3520 offers a selection of types of conditions that may be evaluated. The drop down menu 3530 may be implemented to reline selections, and the drop-down menu 3540 may offer a selection of items for comparison. The field node allows time, price, and order conditions to be evaluated against one another and further allows the user to compare price and order datasets to analytic datasets.

Figure 6:
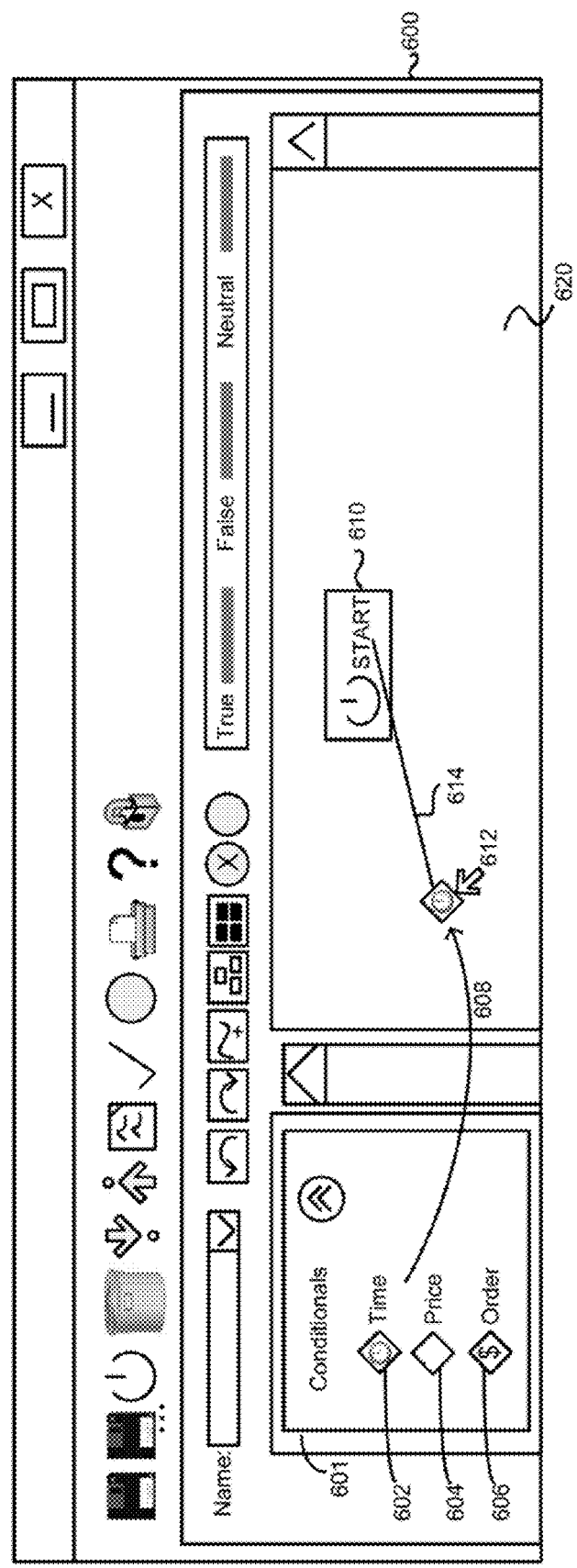
FIG. 6 illustrates a user interface including conditional tools in accordance with an embodiment of the invention.

FIGS. 6-12 below illustrated operation of the time node described above. FIG. 6 illustrates a UI 600 including conditional tools 601 in accordance with an embodiment of the invention. As illustrated, the conditional UI tools 601 may include a time tool 602, a price tool 604, and an order tool 606. As illustrated by arrow 608, the conditional tools 601 may dragged into a sequence grid 620. For example, when the time tool 602 is dragged to the sequence grid 620, an icon 612 appears in the sequence grid 620 and is connected with a start icon 610 by a connecting line 614.

Connecting lines such as line 614 may be automatically drawn by default. As a user places nodes in the sequence grid, for example by clicking, dragging, and dropping, the system attaches connecting lines between the nodes using a pre-programmed strategy. However, if the strategy is inappropriate, a user may perform operations such as deletion of connecting lines, switching the line to neutral or to false, or switching the line direction. Such operations may be performed, for example, by right clicking on a particular connector line and bringing up a drop-down menu.

Each of the conditional tools or nodes 601 may be comprised of flexible parameters that allow the user to manipulate constraints of time, prices, and order criteria. The time node or tool 602 allows users to decide precisely when destinations chosen by a user will receive an order. In order to create an algorithmic sequence using the time node 612, the user may activate the time node 612, for example by double clicking.

Figure 7:
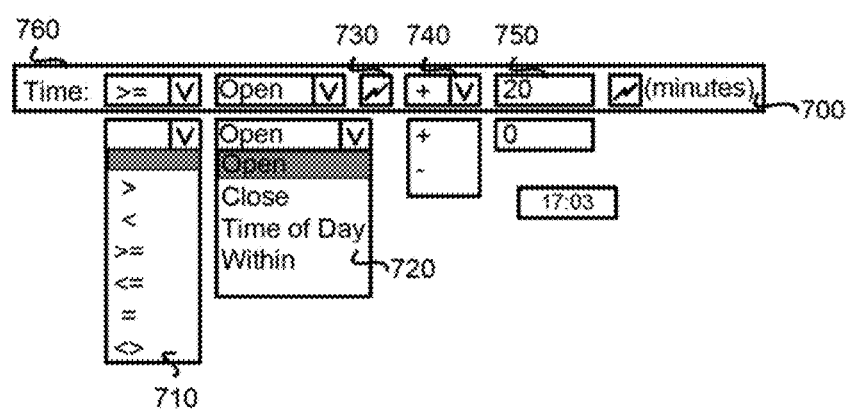
FIG. 7 illustrates a user interface including time manipulation features in accordance with an embodiment of the invention.

FIG. 7 illustrates a UI 700 including time manipulation features that may appear upon activation of the time node 612 shown in FIG. 6. The UI 700 may include a plurality of time manipulation features. Relational symbols 710 may be used in conjunction with reference time points 720. In the displayed embodiment, if "within" is selected from the reference time points 720, a drop-down menu will appear allowing selection of times on a clock.

Lightening bolt 730 allows a user to create parameters that may later be edited. Plus and Minus icons 740 may be selected by a user in conjunction with the open and close time parameters or the within parameter. Blank 750 allows a user to enter a number of minutes for use in conjunction with the open and close parameters or time on a display clock.

Figure 8:
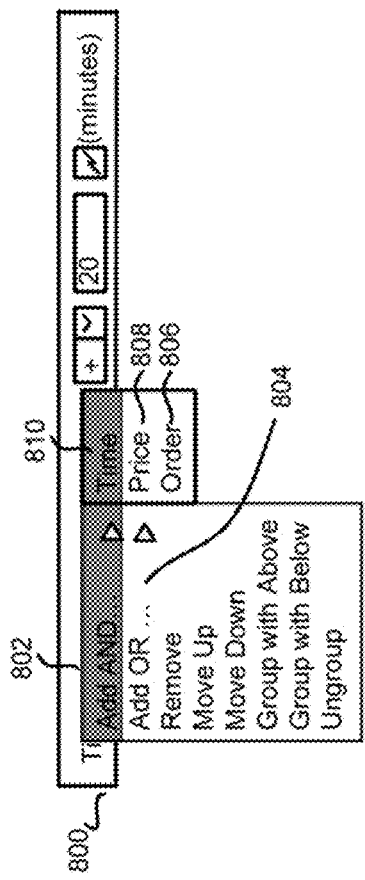
FIG. 8 illustrates a user interface including menus for adding selections in accordance with an embodiment of the invention.

The time designator 760 may be activated, for example by right-clicking, in order to display a drop-down menu as illustrated in FIG. 8 by a UI 800. Options 802 and 804 allow addition of parameters to an algorithm by allowing selection of "Add AND" or "Add OR" in connection with Order 806, Price 808, or Time 806. For example, a user may specify a conditions that determines if an order is within 45 minutes of market close or if an order is 80% executed.

Figure 9:
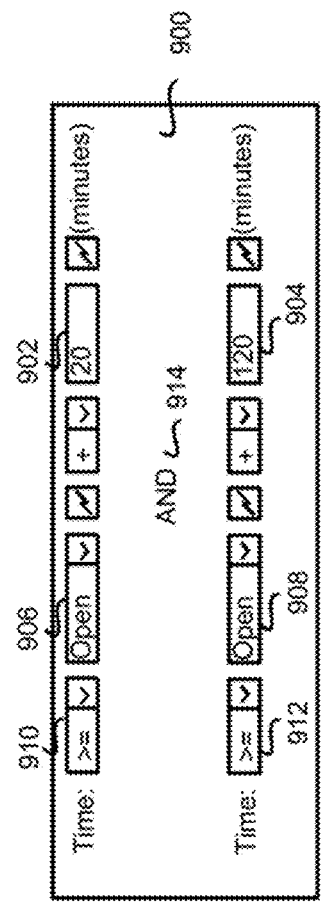
FIG. 9 illustrates a user interface showing existing parameters in accordance with an embodiment of the invention.

FIG. 9 illustrates a UI 900 showing parameters selected by a user from the UI 800 of FIG. 8 in accordance with au embodiment of the invention. In FIG. 9, a user has specified that orders will only be considered valid if they are sent between 20 minutes after the market opens and 120 minutes after the market opens. Parameters 902, 906 and 910 specify the former condition and parameters 904, 908, and 912 specify the latter condition. An "AND" 914 was added to join the two conditions.

Figure 10:
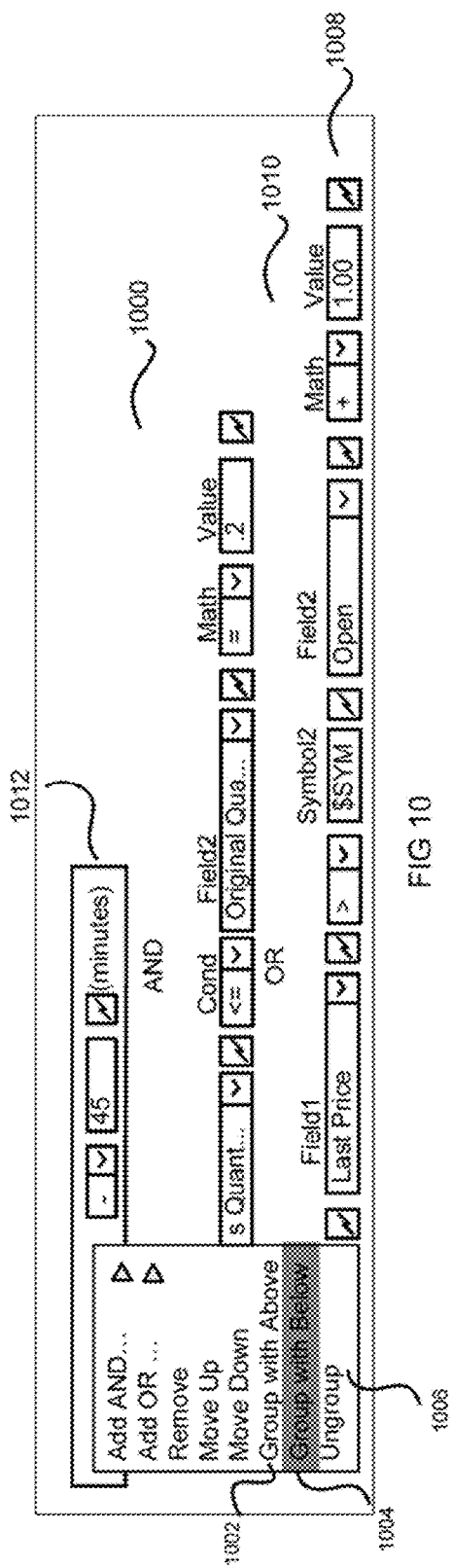
FIG. 10 is a user interface illustrating grouping of features for building an algorithm in accordance with an embodiment of the invention.

FIG. 10 is a UI 1000 illustrating grouping features for building an algorithm in accordance with an embodiment of the invention. The UI 1000 illustrates how multiple sets of parameters can be added to a node. Additions can be made through use of a "group with above" feature 1002 and the "group with below" feature 1004. An ungrouping feature 1006 can remove parameters from an algorithm. Thus, in order to define three distinct sets of parameters for a particular node, the user may utilize the "group with" features 1002 and 1004 For example, A AND B OR C can be modified to react as either (A AND B) OR C or A AND (B OR C). A user can select a parameter row for grouping, for example by right-clicking on the far left of a parameter row 1008, 1010, or 1012 to utilize the group with features 1002 and 1004 in relation to the selected row.

Figure 11:
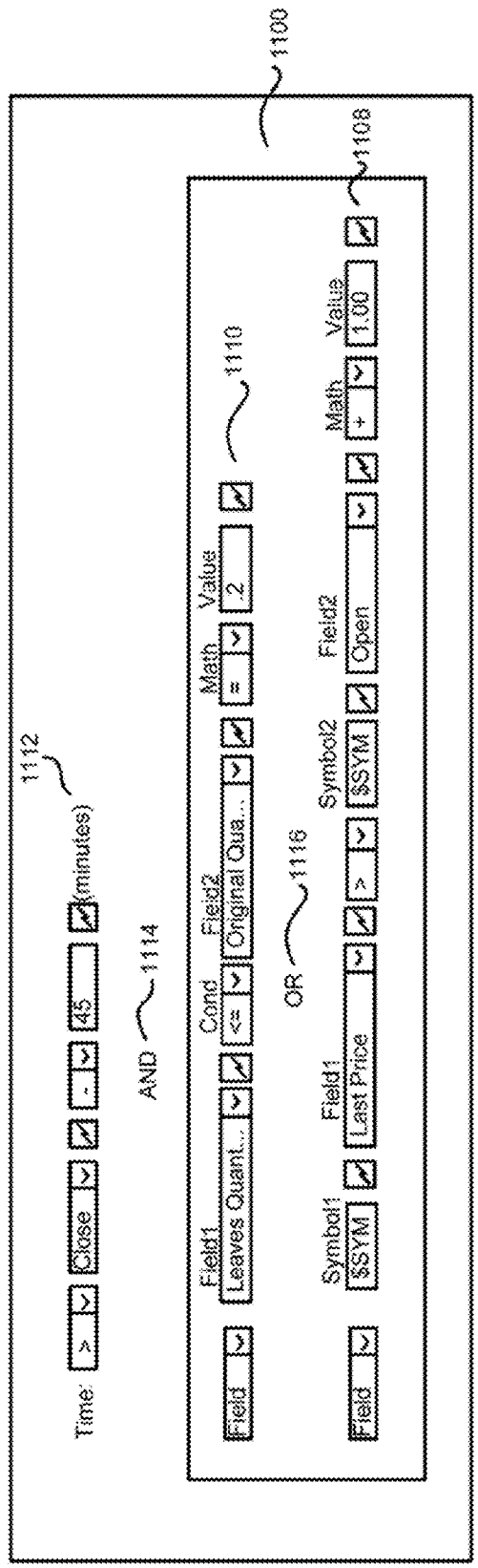
FIG. 11 illustrates a user interface resulting from use of the grouping feature in accordance with an embodiment of the invention.

FIG. 11 illustrates a UI 1100 created through use of the grouping feature in accordance with an embodiment of the invention. In FIG. 11, row 1112 represents condition A, row 1110 represents condition B, and row 1108 represents condition C. An AND 1114 joins rows A and B. OR 1116 joins rows B and C. Thus, the UI 1100 reveals an A AND (B OR C) scenario. In this scenario, an order will only be considered valid if it is executed 45 minutes before the market closes as set forth in row A and is either 80 percent complete as set forth in row B or includes a price that is $1 or greater at open as set forth in row C.

Figure 12:
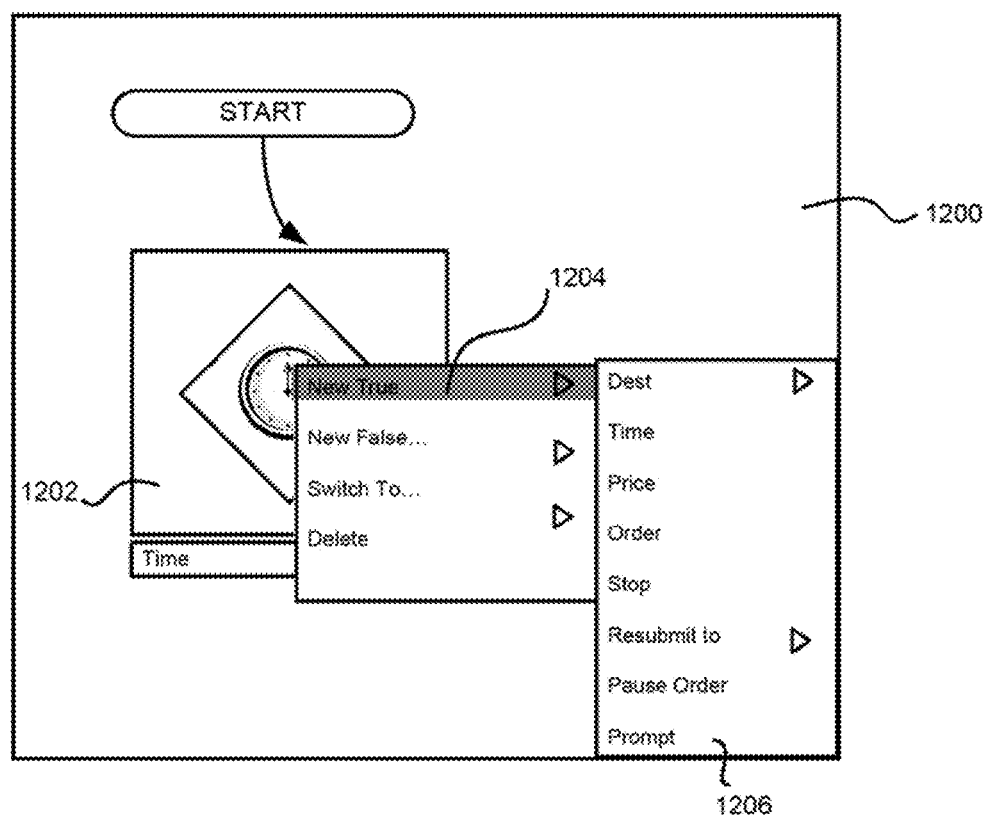
FIG. 12 illustrates a user interface providing a menu of additional features produced from a time node in accordance with an embodiment of the invention.

FIG. 12 illustrates a UI 1200 providing menus 1204, 1206 of additional features produced from a time node 1202 in accordance with an embodiment of the invention. This UI 1200 may appear when a user has finished specifying parameters of the time node 1202. As an example, right-clicking on the time node 1202 may provide access to the additional features of menus 1204 and 1206. The illustrated menus in combination allow addition of a new true or new false destination, time, price, order, stop, pause order, and prompt. Finally, menu 1204 allows deletion of the time node if desired.

Figure 13:
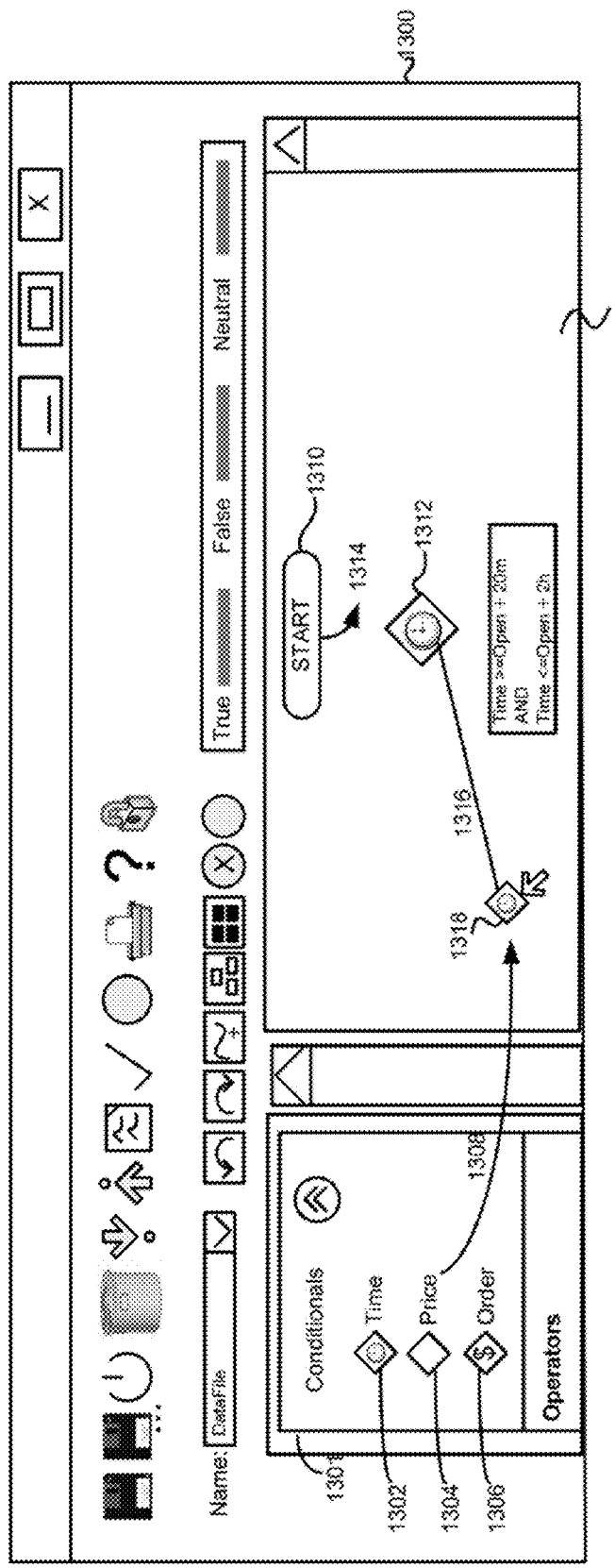
FIG. 13 illustrates a user interface in which a price node conditional is manipulated in accordance with an embodiment of the invention.

FIGS. 13-19 relate to manipulation of the aforementioned price node. FIG. 13 illustrates a UI 1300 in which a price node 1304 is manipulated in accordance with an embodiment of the invention. The UI 1300 includes conditional tools 1301 in accordance with an embodiment of the invention. As illustrated, the conditional UI tools 1301 may include a time tool 1302, a price tool 1304, and an order tool 1306. As illustrated by arrow 1308, the conditional tools 1301 may be incorporated into a sequence grid 1320, for example by dragging and dropping.

In the displayed embodiment, the price tool 1304 is incorporated in the sequence grid 1320 and is displayed as icon 1318. The price icon 1318 is connected with a time icon 1312 that has already been added to the sequence grid 1320. A connecting line 1316 may automatically be drawn between the price icon 1318 and the time icon 1312.

As set forth above, each of the conditional tools or nodes 1301 may be comprised of flexible parameters that allow the user to manipulate constraints of time, prices, and order criteria.

Figure 14:
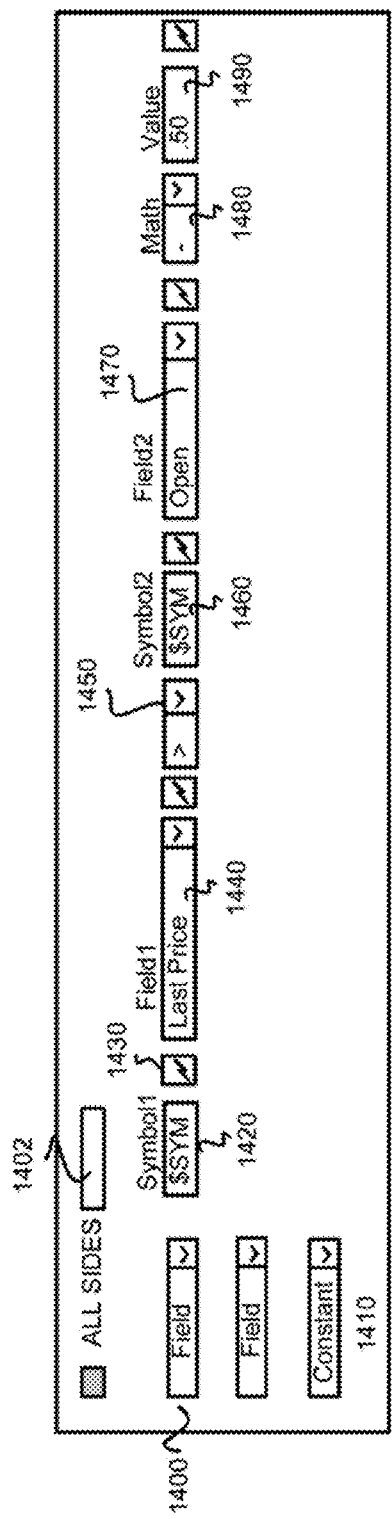
FIG. 14 illustrates a user interface including parameters associated with the price node in accordance with an embodiment of the invention.

FIG. 14 illustrates a UI 1400 including price parameters associated with the price node in accordance with an embodiment of the invention. A field parameter 1410, symbol 1 1420, lightening bolt 1430, field 1 1440, relational operators 1450, symbol 2 1460, field 2 1470, math 1480, and value 1490 are shown. In the illustrated example, the order will only be considered valid of each order symbol's current last price is at least fifty cents below the symbol's open price. The field 1410 allows modification to the layout. The field selection 1410 allows the use of two symbol fields and two field fields. A "constant" selection may also be available that allows fewer fields with more values. The symbol fields 1420 and 1460 allow entry of an individual symbol. The fields 1440 and 1470 allows selection of a reference price, such as last price, bid price, open, high, etc, or alternatively selection of a volume to use in conjunction with various other price parameters. All lightening bolt representations 1430 allow creation of parameters. Math 1480 allows user selection of a math indicator for use in conjunction with various other price parameters. The value field 1490 allows entry of a numerical value.

Figure 15:
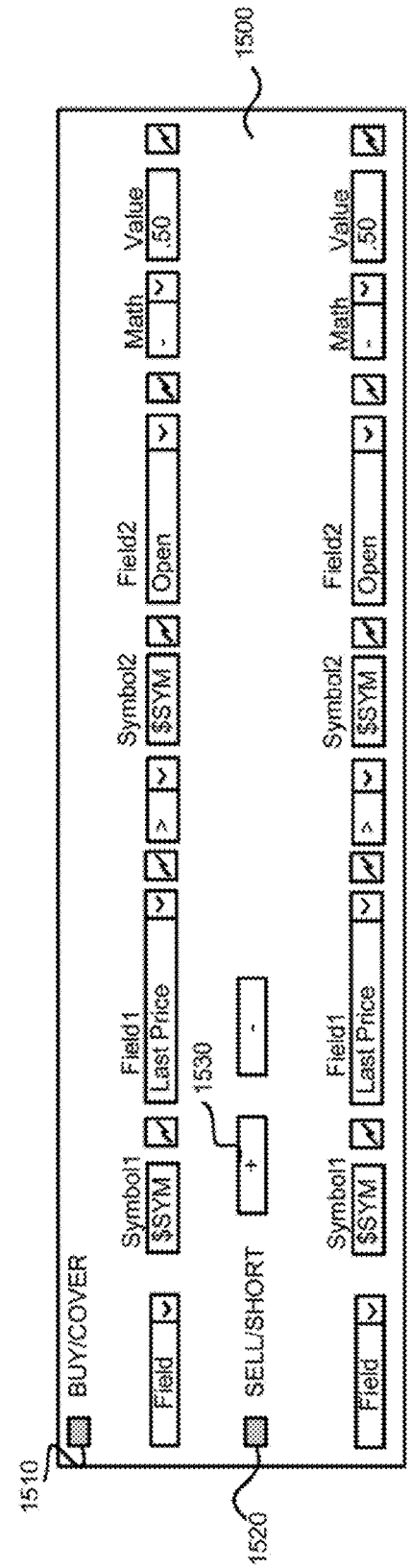
FIG. 15 illustrates a user interface generated through selection of features shown in FIG. 14 in accordance with an embodiment of the invention.

A "+" icon 1402 causes the UI 1400 to expand in order to allow entries of price parameters side by side as illustrated in UI 1500 of FIG. 15. A "buy/cover" indicator 1510 appears in a first row and a "sell/short" indicator 1520 appears in a second row. Selection of a newly presented "+" icon 1530 may divide the "sell/short" line into two different features.

Figure 16:
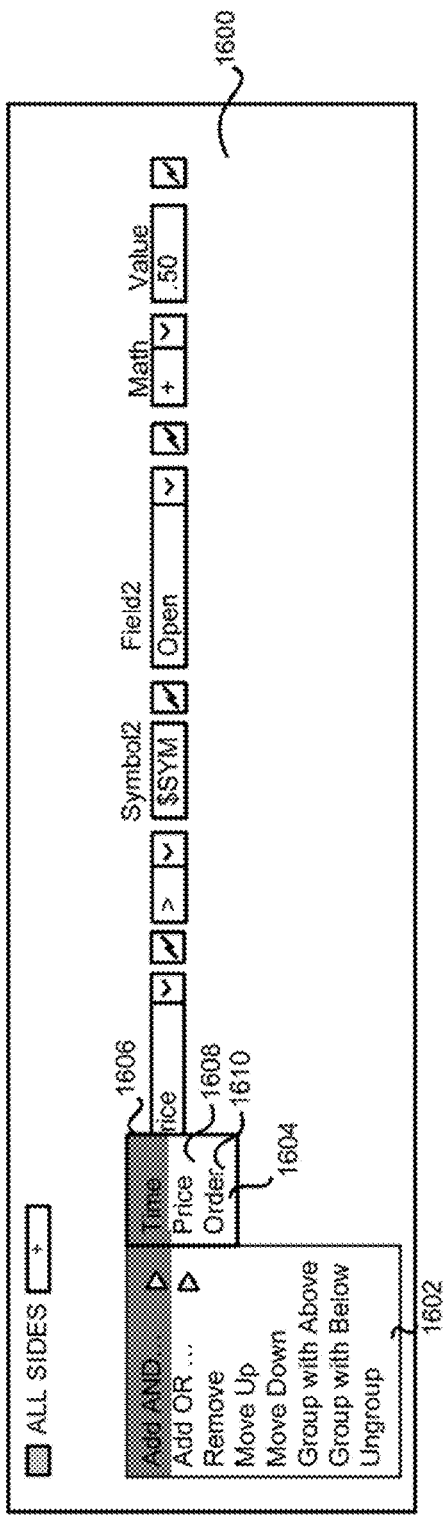
FIG. 16 illustrates a user interface providing access to a conditional menu in accordance with an embodiment of the invention.

As illustrated in FIG. 16, from a UI 1600, a user may activate drop-down menus 1602 and 1604, for example by right-clicking. Menus 1602 and 1604 allow addition of parameters to an algorithm by allowing selection of "Add AND" or "Add OR" in connection with Order 1610, Price 1608, or Time 1606. For example, a user may specify a conditions that determines if an order is within 45 minutes of market close or if an order is 80% executed.

Figure 17:
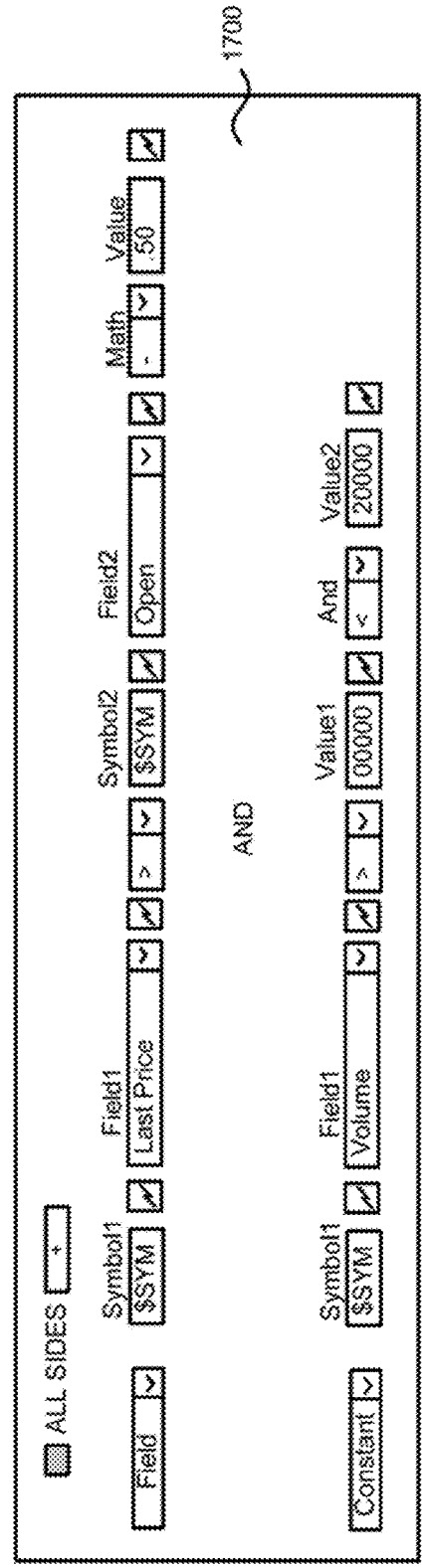
FIG. 17 illustrates a user interface displaying an algorithm generated through selection of conditionals in accordance with an embodiment of the invention.

FIG. 17 illustrates a UI 1700 showing an example of parameters selected by a user from the UI 1600 of FIG. 16 in accordance with an embodiment of the invention. In FIG. 17, a user has specified that orders will only be considered valid if each order's symbol's current last price is at least fifty cents below the symbol's open price and the symbol's volume is greater than 500,000 shares, but less than 2,000,000 shares.

Figure 18:
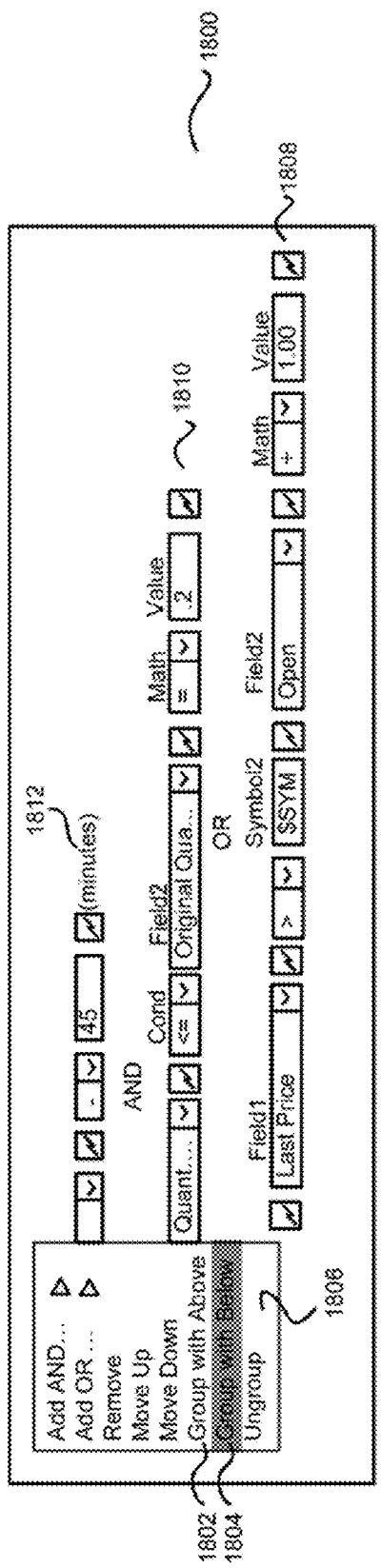
FIG. 18 illustrates a user interface for adding multiple sets of parameters in accordance with an embodiment of the invention.

FIG. 18 is a UI 1800 illustrating grouping features for building an algorithm based on price parameters in accordance with an embodiment of the invention. The UI 1800 illustrates how multiple sets of parameters can be added to a node. Additions can be made through use of the "group with above" feature 1802 and the "group with below" feature 1804. An ungrouping feature 1806 can remove parameters from an algorithm. Thus, in order to define three distinct sets of parameters for a particular node, the user may utilize the "group with" features 1802 and 1804 For example, A AND B OR C can be modified to react as either (A AND B) OR C or A AND (B OR C). A user can select a parameter row for grouping, for example by right-clicking on the far left of a parameter row 1808, 1810, or 1812 to utilize the group with features 1802 and 1804 in relation to the selected row.

Figure 19:
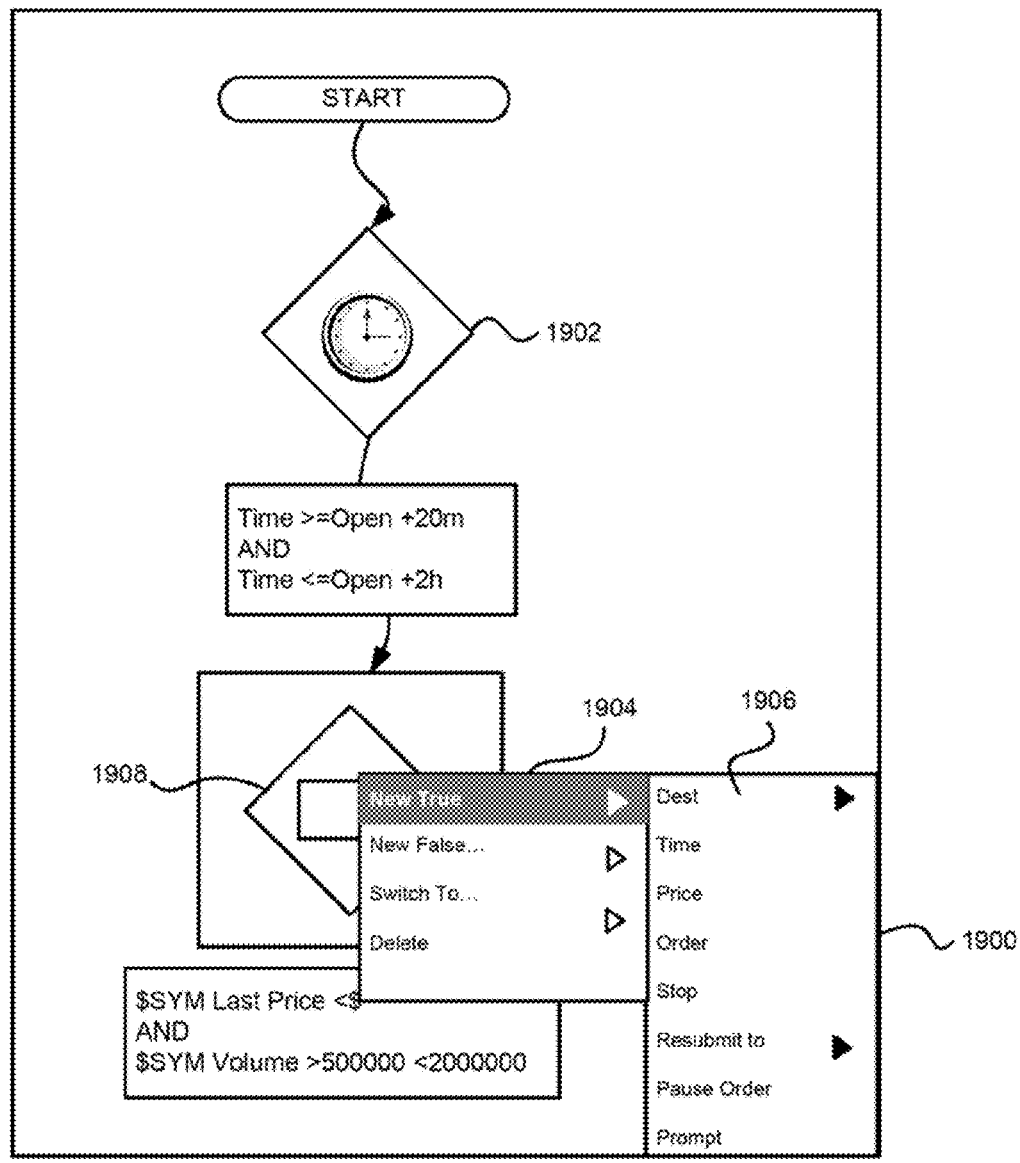
FIG. 19 illustrates a sequencing grid view of the user interface in accordance with an embodiment of the invention.

FIG. 19 illustrates a UI 1900 providing a menu 1904, 1906 of additional features produced from a time node 1902 in accordance with an embodiment of the invention. This UI 1900 may appear when a user has finished specifying parameters of the time node 1902 and a price node 1908. As an example, right-clicking on the price node may provide access to the additional features of menus 1904 and 1906. The illustrated menus in combination allow addition of a new true or new false destination, time, price, order, stop, pause order, and prompt. Finally, menu 1904 allows deletion of the price node if desired.

Figure 20:
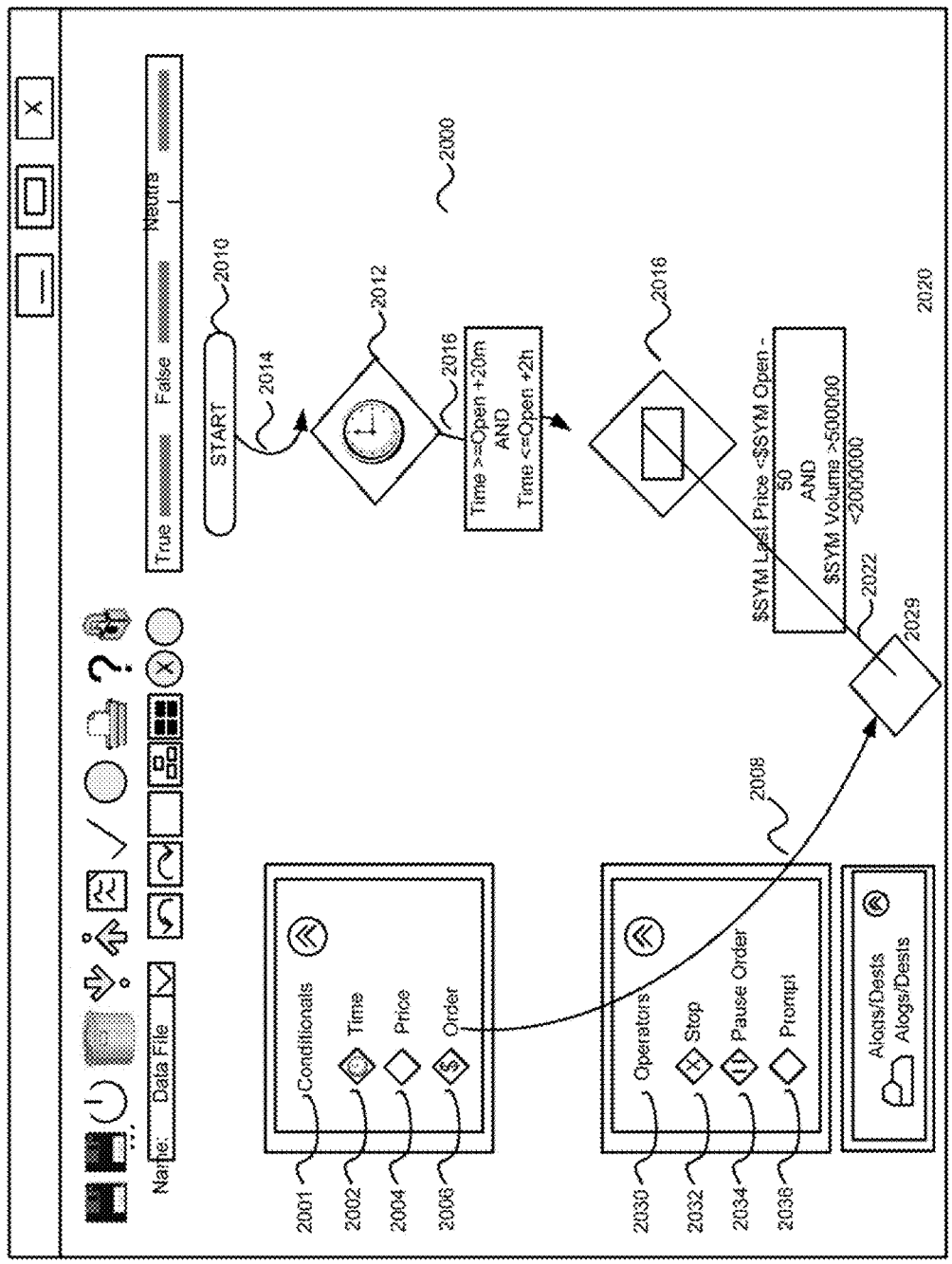
FIG. 20 illustrates a user interface on which an order conditional node is manipulated in accordance with an embodiment of the invention.

FIGS. 20-24 relate to manipulation of the aforementioned order node. FIG. 20 illustrates a sequencing grid view of a UI 2000 in accordance with an embodiment of the invention. An order node 2006 is manipulated in accordance with an embodiment of the invention onto the grid 2020. The order node becomes order icon 2024 on the grid 2020 and is joined to a price node 2018 by a line 2022. The price node 2018 is joined by line 2016 to a time node 2012. A start button 2010 is linked to the time node 2012 by a line 2014. As described above, the UI 2000 includes conditional tools 2001 in accordance with an embodiment of the invention. As illustrated, the conditional UI tools 2001 may include a time tool 2002, a price tool 2004, and an order tool 2006. As illustrated by arrow 2008, the conditional tools 2001 may be incorporated into a sequence grid 1320.

In the displayed embodiment, the order tool 2006 is dragged into the sequence grid 2020 and is displayed as icon 2024. The order icon 2024 is connected with a price icon 2018 that has already been added to the sequence grid 2020. The connecting line 2022 may automatically be drawn between the order icon 2024 and the price icon 2018.

Figures 21, 22, 23:
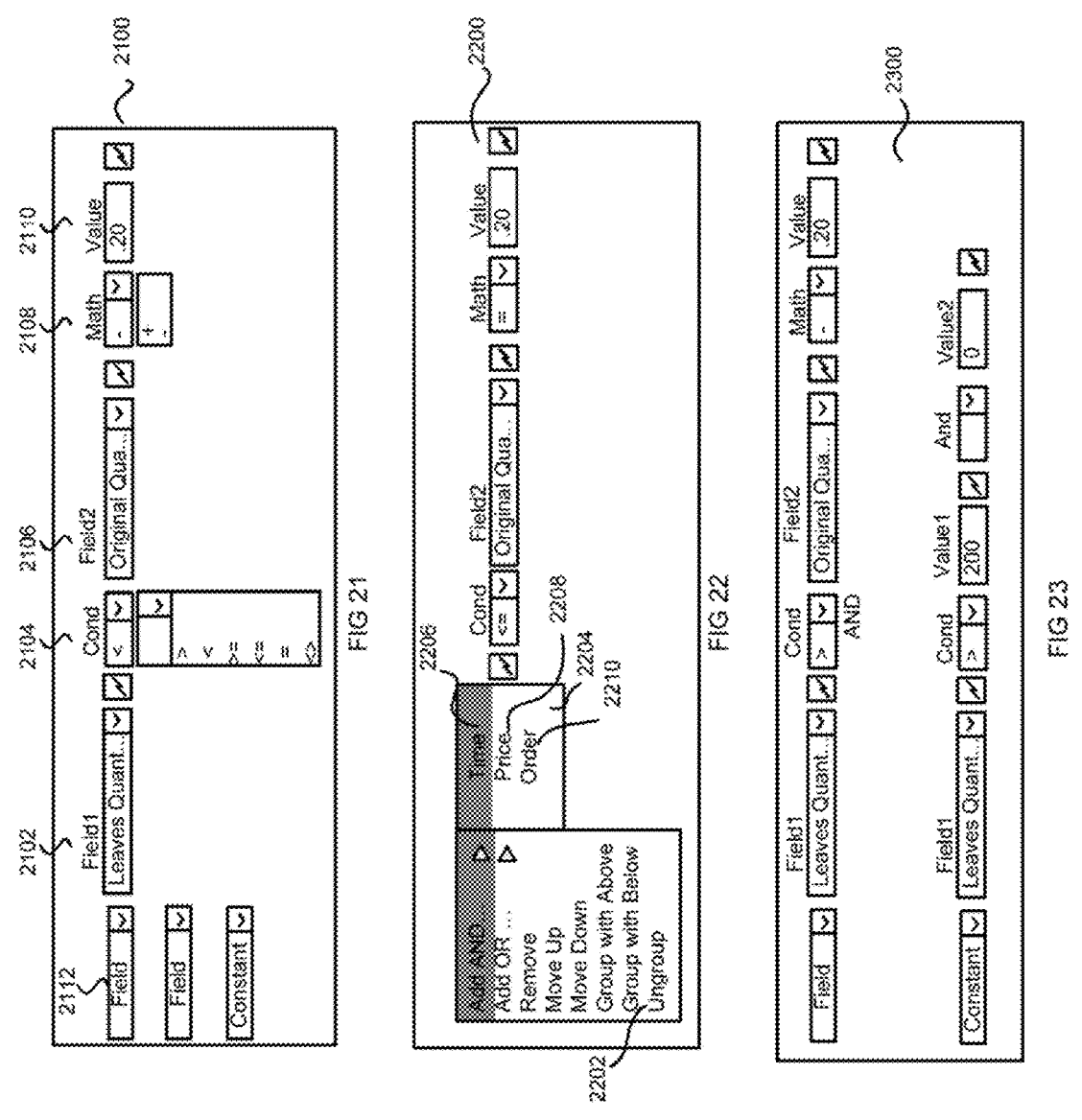

FIG. 21 illustrates a UI 2100 showing features for entering order parameters including a first field 2102, a condition 2104, a second field 2106, math 2108, and value 2110. The illustrated example indicates the order parameters of "Leaves quantity<Original Quantity*0.20". Orders will only be considered valid with this particular node if the remaining quantity of each order's size is less than the order's original size by 20 percent.

A field feature 2112 allows manipulation of the layout of the parameter box. Fields 1 and 2 (2102 and 2106) allow user selection of a reference order component such as original quantity, entry price, execution price, executed quantity, or leaves quantity to use in conjunction with various other order parameters. The condition field 2104 allows a user to select an indicator to use in conjunction with various other order parameters. The lightening bolt 2114 allows users to create parameters that may be edited at a later time from an action confirm box. The math field 2108 allows a user to select a math indicator to use in conjunction with order parameters. The value field 2110 allows a user to enter a numerical value to use in conjunction with various other order parameters.

As illustrated in FIG. 22, from a UI 2200, a user may activate drop-down menus 2202 and 2204, for example by right-clicking. Menus 2202 and 2204 allow addition of parameters to an algorithm by allowing selection of "Add AND" or "Add OR" in connection with Order 2210, Price 2208, or Time 2206.

FIG. 23 illustrates a UI 2300 showing parameters selected by a user from the UI 2320 of FIG. 22 in accordance with an embodiment of the invention. In FIG. 23, a user has specified that orders will only be considered valid if the remaining quantity or each order's size is less than the order's original size by 20 percent and if the remaining quantity is over 200 shares.

Furthermore, as set forth above with respect to the time and price nodes, algorithms may be constructed using "group with above" and "group with below" functions.

Figure 24:
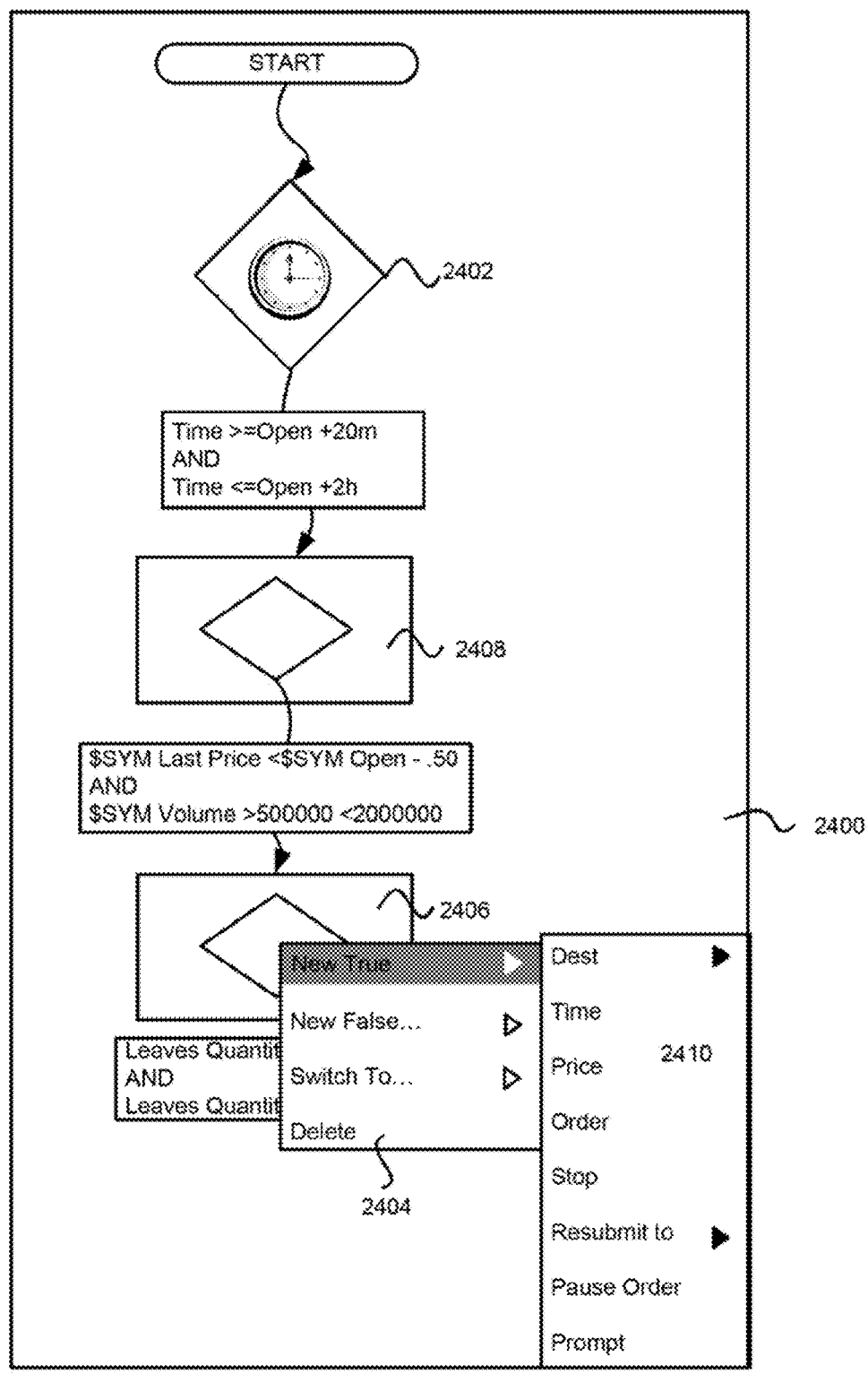
FIG. 24 illustrates a sequence grid view of a user interface in accordance with an embodiment of the invention.

FIG. 24 illustrates a UI 2400 showing a sequencing grid in accordance with an embodiment of the invention. The UI 2400 provides a menu 2404, 2406 of additional features produced from an order node 2410 in accordance with an embodiment of the invention. This UI 2400 may appear when a user has finished specifying parameters of a time node 2402 a price node 2408, and the order node 2410. As an example, right-clicking on the order node may provide access to the additional features of menus 2404 and 2406. The illustrated menus in combination allow addition of a new true or new false destination, time, price, order, stop, pause order, and prompt. Finally, menu 2404 allows deletion of the order node if desired.

Figure 25:
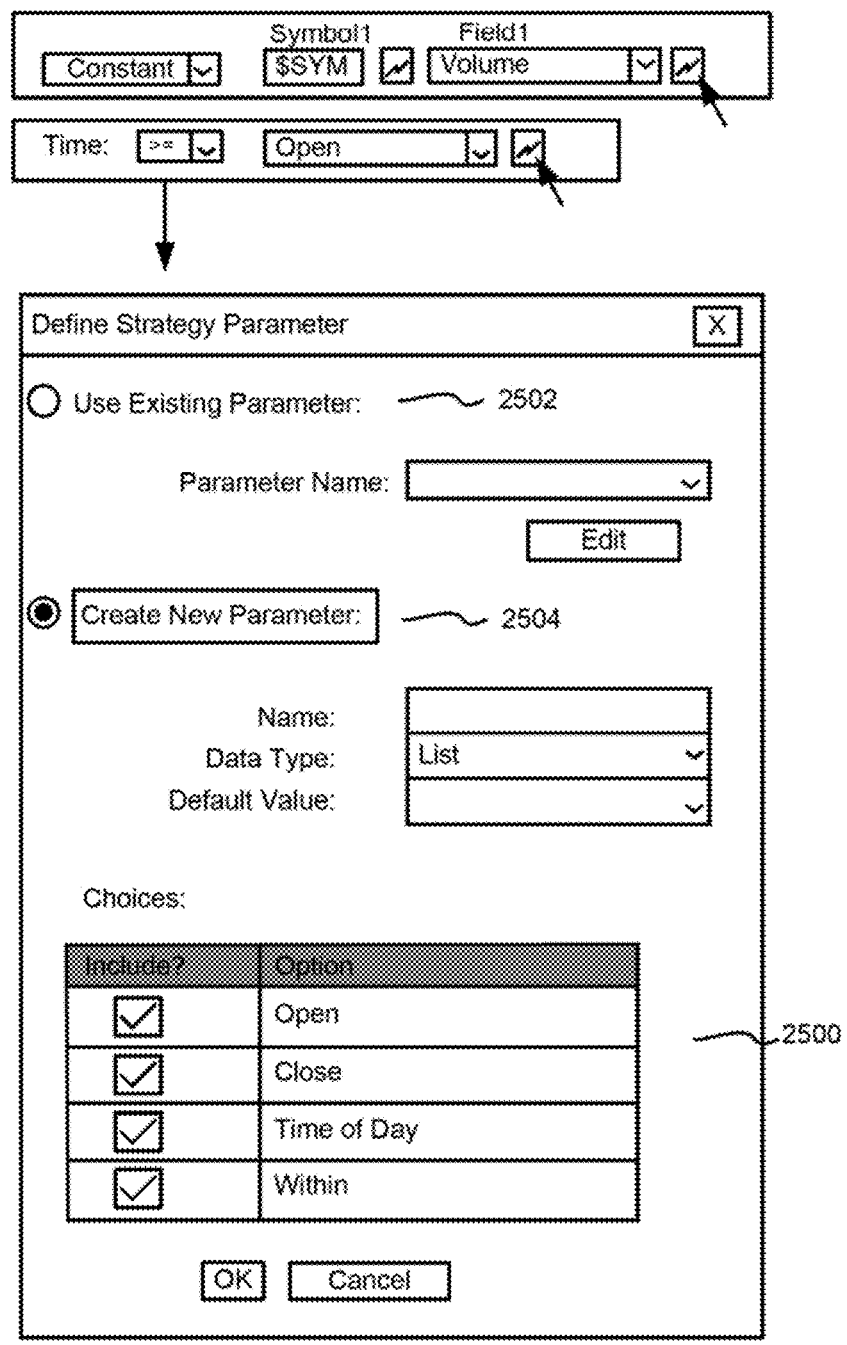
FIG. 25 illustrates a user interface display for defining strategy parameters in accordance with an embodiment of the invention.

FIG. 25 illustrates the operation of the lightning bolt icons mentioned above. The lightning bolt icons allow creation of parameters that may be edited at a later time from an action confirm box. This functionality allows users to defer specifying an exact order values until an order is sent. When a user selects a lightning bolt within the parameter boxes of time, price, and order nodes, a define strategy parameters box 2500 appears. The define strategy parameters box 2500 includes a space 2502 for using an existing parameter and an option 2504 for creating a new parameter.

Figure 26:
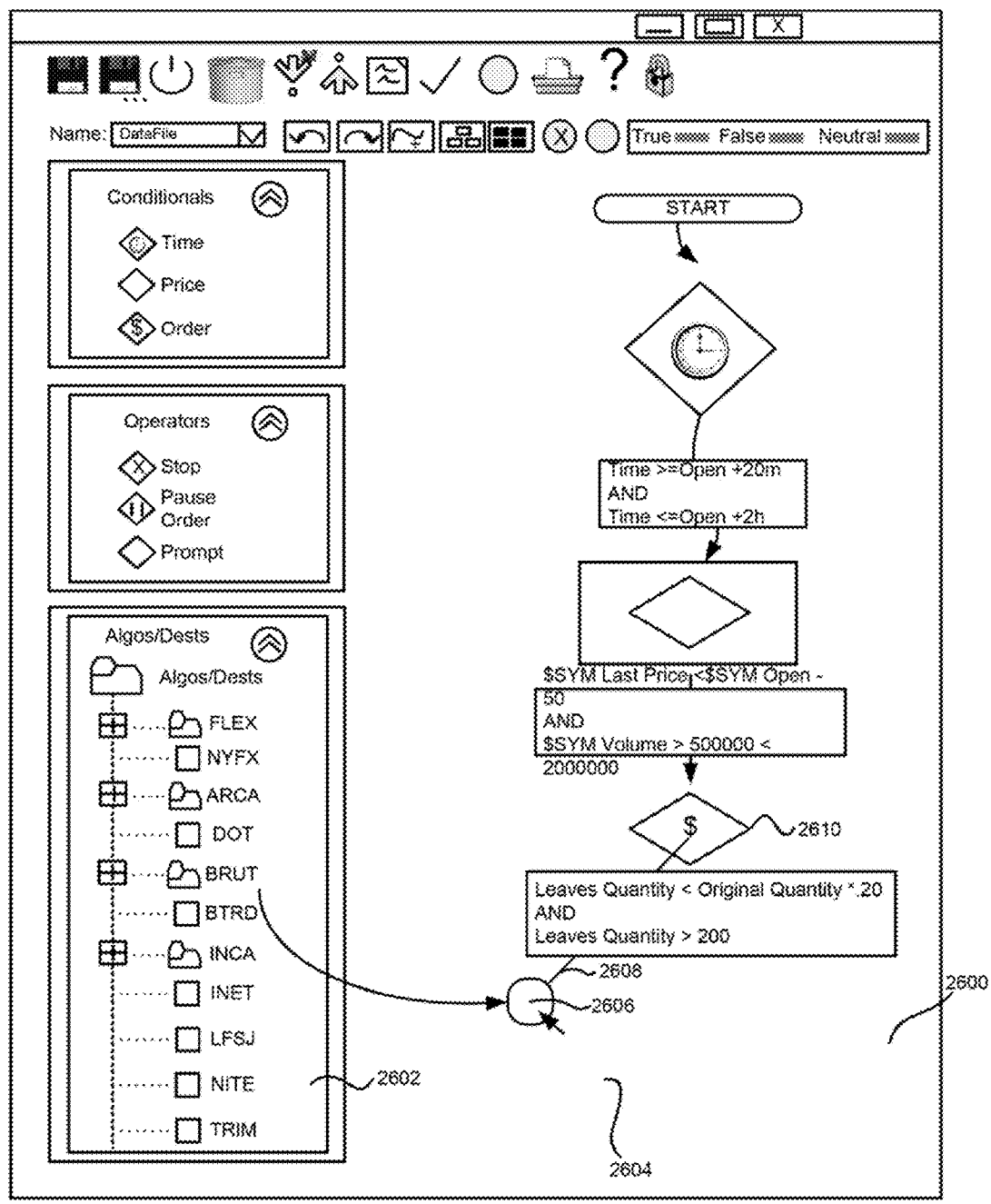
FIG. 26 illustrates a user interface in which algorithms and destinations are manipulated in accordance with an embodiment of the invention.

FIG. 26 illustrates a UI 2600 in which algorithms and destinations 2602 are manipulated in accordance with an embodiment of the invention. As set forth above with respect to the conditional nodes, algorithms and destinations 2602 may be dragged or otherwise incorporated into the sequencing grid 2604 and be displayed as icon 2606. The system automatically adds a directional line 2608 to connect the algorithm and destination node 2606 with an order node 2610.

Figure 27:
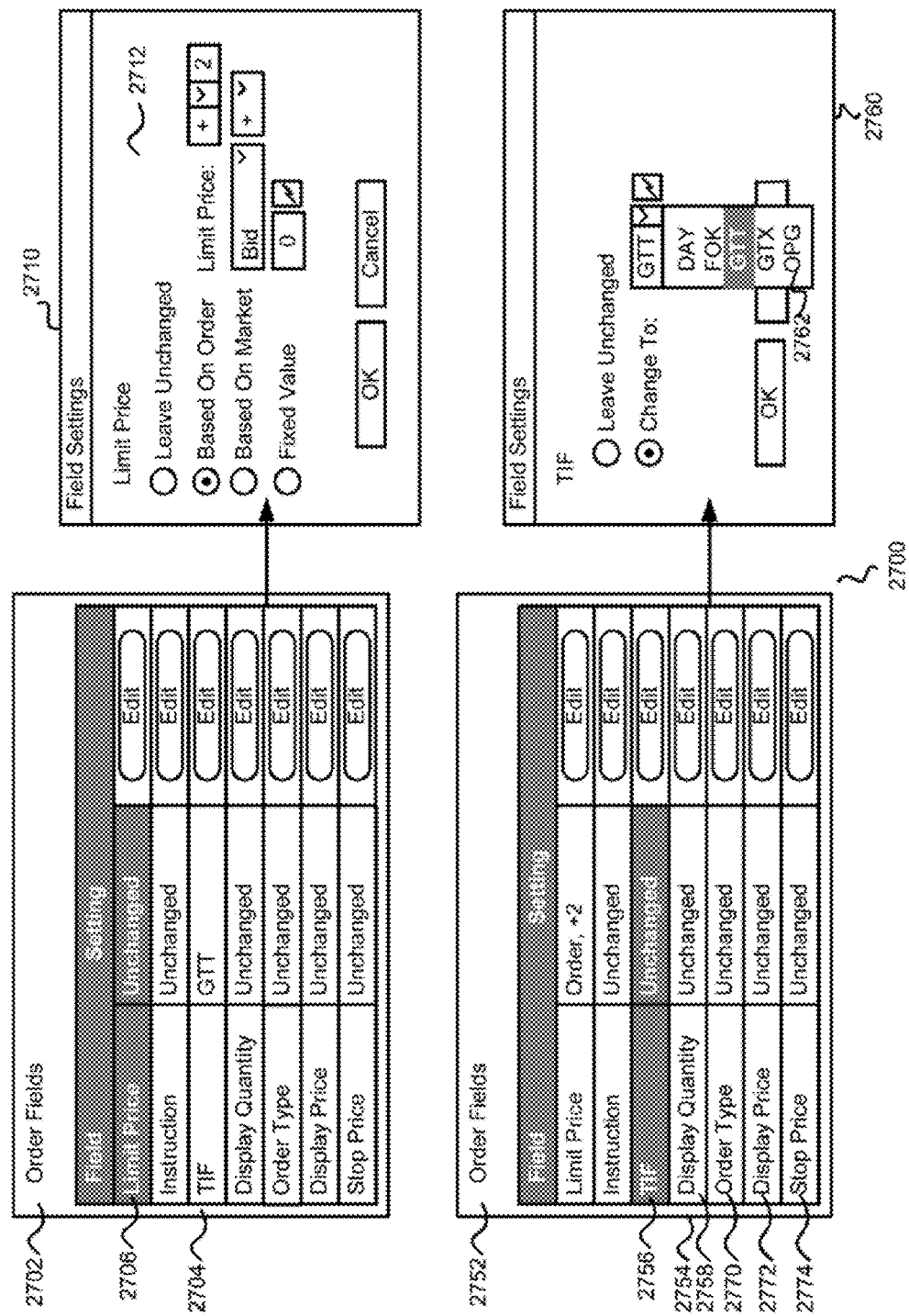
FIG. 27 illustrates a user interface including order fields in accordance with an embodiment of the invention.

In order to edit order parameters, in embodiments of the invention, a user may double click on, or perform other types of manipulation operations with respect to the destination node 2606 on the sequencing grid 2604. FIG. 27 illustrates a UI 2700 including order field boxes 2702 and 2752 in accordance with an embodiment of the invention. Within these order field boxes, a user may edit displayed parameters 2704 and 2754. For example, a user may edit prices, order type, time in force, and display quantity. The displayed parameters 2754 include limit price, which is the price at or below a user would like to buy the entered symbol or at or above which the user would like to sell the entered symbol. Depending on the selected order type, this field may be active or inactive. The displayed parameters 2754 further include an instruction parameter, which is an order instruction directed to a selected destination.

A limit price field 2706 may generate a pop-up 2710. The pop-up 2710 offers options 2712 for altering the limit price.

Selection of a parameter such as TIF (Time in Force) 2756 may generate a menu 2760 containing a drop-down menu 2762 of multiple TIF types which may be selected by a user. Available selections for TIF may include DAY, DAY+, "Fill or Kill" (FOK), "Good til Cancel" (CTC), "Good til Cross" (GTX), "Immediately or Cancel" IOC, "Opening" (OPG). The selection of DAY may indicate that the order must be filled by the end of the current day or it will be canceled. The selection of DAY+ indicates that the order must be filled by the end of the current extended trading day or the order will be canceled. The selection of FOK indicates that the entire size of the order must be filled immediately or the order will be canceled. The selection of GTX indicates that the order will remain active until filled or canceled by the trader. The selection of IOC indicates that at least a portion of the order must be filled immediately or the order will be canceled.

A display quantity 2758 shows the number of shares to be displayed once an order is sent. Specifying a display quantity number allows display of a lower number of shares for an order than the actual number entered in the size field when the order was created.

An order type 2770 may also generate a drop down menu listing various order types including Direct+, LMT, LOB, LOC, MKT, MOC, PEG, SLMT, and STOP. Direct+ causes an order to be filled using an automatic execution service. LMT causes the order to be filled only if the entered symbol reaches the price specified in the limit field. LOB, or Limit or Better causes the order to be routed to a group of market participants at the inside limit price. LOC, limit on close, causes the order to be filled as a limit order as close as possible to the end of the current day. MKT causes the order to be filled at the current market price. MOC causes the order to be filled as a market order as close as possible to the end of the current day. PEG may cause various pegging order types to appear in a pegging field menu. SLMT, stop limit, results in the order being tilled only if the entered symbol reaches or betters the price specified in the stop price field, but does not exceed the price specified in the limit price field. If STOP is selected as the order type, then the order will be filled only if the entered symbol reaches or betters the price specified in the "stop price" field.

A display price field 2772 may be used differently in conjunction with different types of orders. A stop price field 2774 defines the maximum stop price for a buy order or minimum stop price for a sell order. For this field to become active, STOP or SLMT must be selected as the order type.

Figure 28:
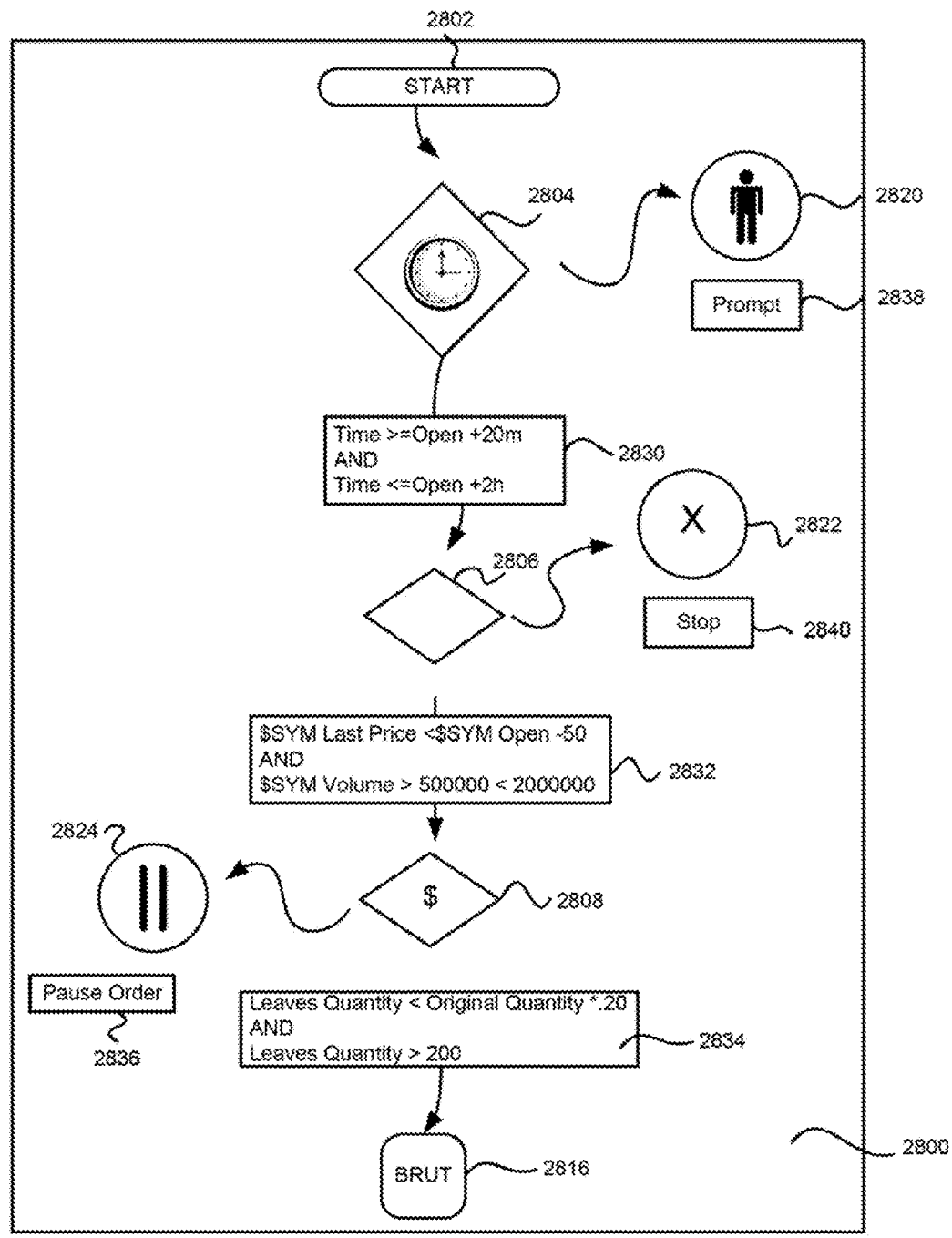
FIG. 28 illustrates addition of a destination and operators to the sequencing grid in accordance with an embodiment of the invention.

FIG. 28 illustrates addition of a destination 2810 and operators 2820, 2822, and 2824 to a sequencing grid 2800 in accordance with an embodiment of the invention. At any time during construction of the algorithmic sequence the trader may insert a stop 2822, pause 2824, or prompt 2820. For descriptive purposes, the sequence grid 2800 may include a stop label 2840, a prompt label 2838, and a pause order label 2836. The operator nodes 2820, 2822, and 2824 may be dragged the sequencing grid in the same manner as conditional nodes such as a time node 2804, price node 2806, and order node 2808. For convenience, the sequencing grid 2800 may label these nodes appropriately at 2830, 2832, and 2834 respectively. Preceding all algorithmic sequences, the sequencing grid 2800 provides a start node 2802.

The stop node 2822 will stop a sequence and cancel an active order in the market. The pause node 2824 may pause a sequence and keep it running while canceling the active order in the market. The prompt node 2820 may generate a visual prompt and require trader input.

Figure 29:
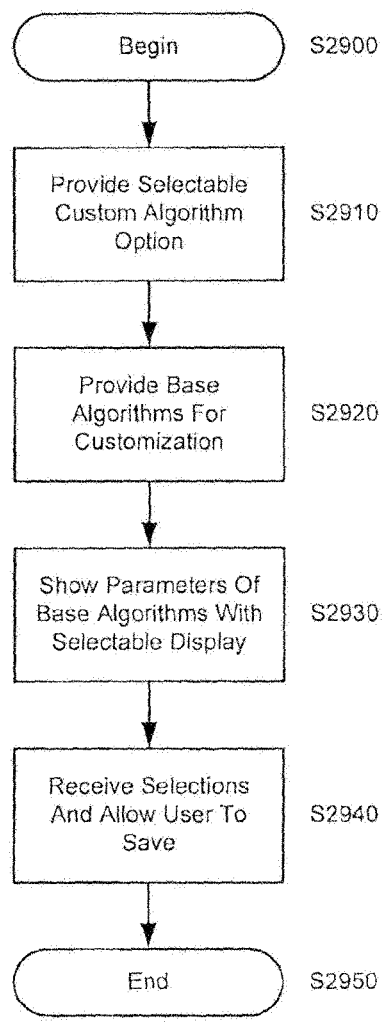
FIG. 29 is a flow chart illustrating customization of an algorithm in accordance with an embodiment of the invention.

FIG. 29 is a flow chart illustrating customization of an algorithm in accordance with an embodiment of the invention. The method begins in S2900 and the algorithmic trading management system provides a selectable custom algorithm option in S2910. In S2920, the system provides base algorithms for customization upon receiving a user's selection of the custom algorithm option. In S2930, the system shows parameters of the base algorithm with a selectable display. In S2940, the system receives selections and allows the user to save the created algorithm.

FIG. 30 illustrates a confirmation UI 3000 in accordance with an embodiment of the invention. The confirmation UI 3000 allows a user to change any of the order's components, generally through input fields and drop down menus 3010.

Figure 31:
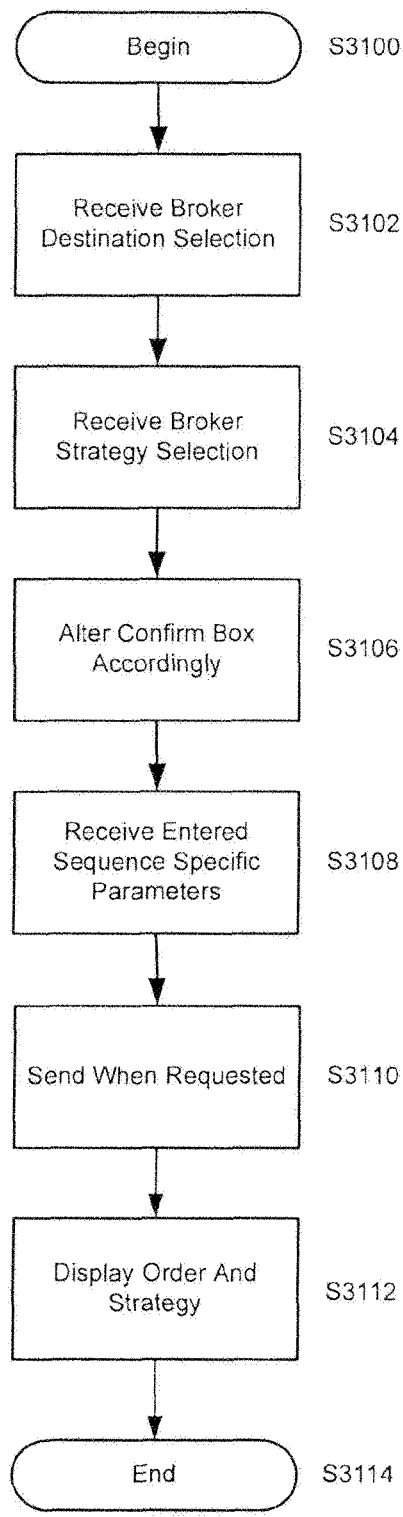
FIG. 31 is a flow chart illustrating a process for facilitating order placement and monitoring in accordance with an embodiment of the invention.

FIG. 31 is a flow chart illustrating a process for facilitating order placement and monitoring implementing the confirmation UI 3000 of FIG. 30 in accordance with an embodiment of the invention. The method begins in S3100 and in S3102, the system receives a broker destination selection through the interface 3000. In S3104, the system receives a broker strategy selection. In response to the strategy selection, the system may alter the interface 3000 accordingly in S3106. In S3108, the system receives entered sequence specific parameters. In S3110, the system sends the order when requested and in S3112, the system displays the order and strategy. The process ends in S3114. The sequence illustrated is merely exemplary. These actions could occur in a number of different sequences as long as the system ultimately allows monitoring of an order's progression.

In order to locate liquidity, the system is capable of visiting a user's selected destinations sequentially, in a round robin format. Alternatively, the system is capable of simultaneously accessing all requested destinations to represent an order. In the round robin approach, because of the timing, the system is more likely to miss potential sources of liquidity, since it only visits a potential source of liquidity briefly at predetermined intervals. If instead, the system accesses all selected destinations simultaneously, then at any given moment, the system finds any available liquidity. Upon detection of liquidity, the system automatically rebalances in accordance with user-selected parameters. The system will repeatedly rebalance during representation in sources of liquidity such as, for example, dark pools.

The functionality of the shotgun or smart order node allows a user to activate the above-described features to simultaneously route orders to multiple markets. This functionality is particularly useful for managing work flow around dark pools. Typically traders only use a small number of dark pools or use a broker's dark pool aggregating algorithm because the manual workflow around using large numbers of dark pools is too cumbersome. The shotgun or smart order node allows for a simple configuration to simultaneously access multiple sources of liquidity.

Figure 34:
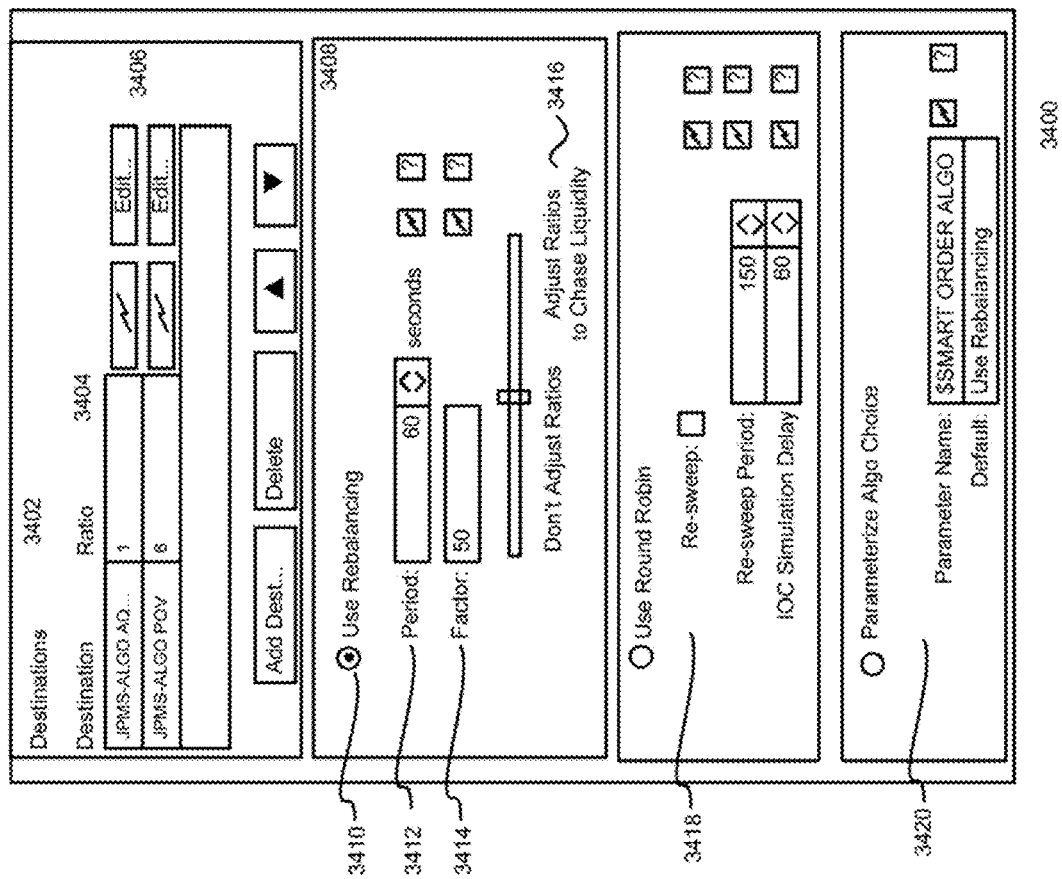
FIG. 34 is a screen shot illustrating order setup through a shotgun node in accordance with an embodiment of the invention.

FIG. 34 illustrates a screen shot 3400 showing shotgun or smart order node functionality. Destinations 3402 may be contained in a list 3404 and include all of the destinations that a trader chooses to access. A ratio associated with each destination defines a weighting for each destination. In embodiments of the invention, the destinations 3402 are dark pools, but other sources of liquidity may also or alternatively be included. User actuated controls 3408 may allow addition and/or deletion of destinations. Option 3410 may allow use of rebalancing in accordance with user-set parameters. Additionally, a time period 3412 and a factor 3414 may be selected.

The time period 3412 may be a period in seconds between forced rebalanced operations or the amount of time that must elapse before a rebalance. In practice, the period is a minimum delay between rebalance operations because rebalancing will not occur for an order until at least one destination has completed its assigned portion of the order in any given rebalance interval. Thus, if no destinations have completed the order after this period expires, then rebalancing will wait for the first destination to complete its order and rebalance immediately thereafter. If, however, one or more destinations have completed their orders before this period expires, then rebalancing will wait until the period expires.

The factor 3414 determines how aggressively child order portions will be adjusted from an initial ratio to an execution ratio. The factor 3414 is the additional weight given to destinations based on the amount of shares filled. The factor range is from zero to one. A value of zero will not change the original weighting at all. A value of one is the extreme side of targeting the most liquid destinations and would completely ignore the original ratios and rebalance everything to the destinations filling the liquidity. A value of 0.5 is balanced between the original ratios and those destinations that are providing fills. A complex formula may be provided to determine the rebalance for all ratios. A sliding scale 3416 or other type of user adjustment device may allow adjustment of the factor 3414.

Other options available may include an option 3418 to use round robin. Selection of the round-robin option 3418 deactivates the rebalancing option. The rebalance option and round robin option may be selected intermittently by the user.

An option 3420 to parameterize algorithm choice is a radial button that provides the user with the ability to choose a re-balancing approach or round robin approach at the time of order confirmation. Users may default to one of the two approaches and may change the approach before the order is sent.

Figure 36:
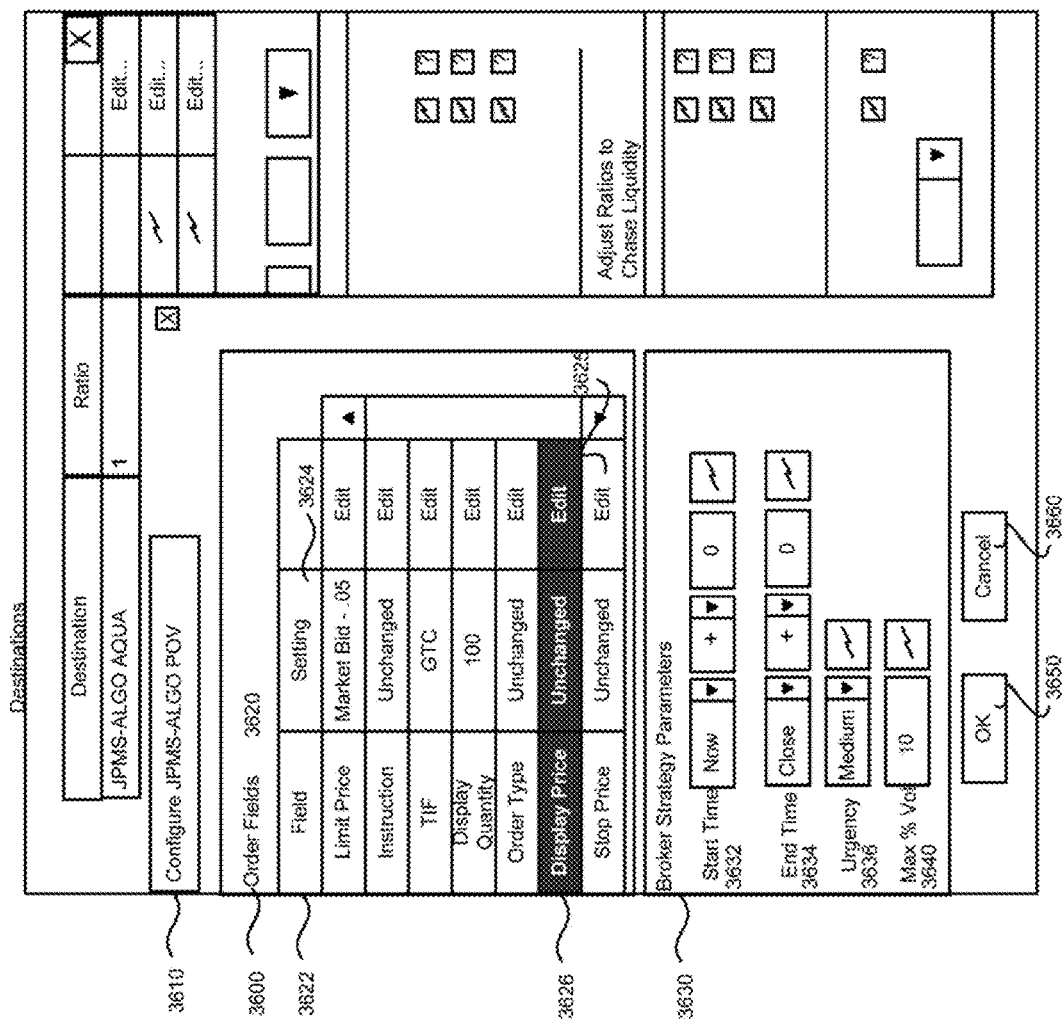
FIG. 36 is a screen shot illustrating a destination setup in accordance with an embodiment of the invention.

FIG. 36 is a screen shot 3600 illustrating configuration of a destination, such as the destinations shown in FIG. 34. A header 3610 shows the destination under configuration. Order fields 3620 may include an identifying field 3622 and setting 3624. Editing can be accomplished using edit buttons 3625, edited as shown. Broker strategy parameters 3630 may include start time 3632, end time 3634, urgency 3636, and maximum volume 3640. An okay button 3650 may be available to accept the settings and a cancel button 3660 may delete changes.

While the disclosed system has primarily been described as processing single orders, it may also be implemented in multi-order situations. These multi-order situations may include pairs and portfolio trading.

Thus, the disclosed algorithmic trading management system facilitates automated trading and software programming by traders without computer programming expertise. Traders are able to construct new algorithms, modify existing algorithms, and utilize existing algorithms. Traders are also able to combine algorithms. Before, during, and after execution of orders, traders without technical expertise are able to monitor progress of each order.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. An algorithmic trading management computer system for facilitating electronic market participation of traders, the algorithmic trading management computer system comprising:
a sequence construction module for providing, using computer processing components, conditional user interface features on a computer user interface for allowing traders to construct a sequence for structuring at least one trading order, the sequence construction module automatically generating at least one trading algorithm sequence based on the constructed sequence for structuring at least one trading order;
sequence modification components for allowing, using the computer processing components, traders to modify collected algorithms collected from external sources in order to customize the sequence through the computer user interface, the sequence modification components automatically modifying the at least one algorithm sequence based on the customization; and
operator intervention tools for allowing, using the computer processing components, traders to manually influence sequence execution through the computer user interface
wherein the at least one algorithm sequence is processed by at least one computing processing component to complete at least one trading order.

2. The computer system of claim 1, wherein the sequence construction module comprises a time control engine for allowing a trader to determine time order parameters.

3. The computer system of claim 1, wherein the sequence construction module comprises a price control engine for allowing a trader to determine price order parameters.

4. The computer system of claim 1, wherein the sequence construction module comprises an order control engine for allowing a trader to determine order details, the order details including order parameters.

5. The computer system of claim 1, wherein the sequence construction module comprises a time control engine, a price control engine, a field control engine, and an order control engine for allowing a trader to customize and compare time, price, and order parameters.

6. The computer system of claim 5, further comprising a sequence control engine for automatically displaying a sequence of determined time, price, and order parameters.

7. The computer system of claim 6, wherein the sequence control engine provides a sequencing grid on the computer user interface for enabling the trader to view the selected sequence.

8. The computer system of claim 7, wherein the time control engine, price control engine, field control engine, and order control engine are represented by a corresponding time node, price node, field node, and order node on the computer user interface.

9. The computer system of claim 8, wherein the time node, price node, field node, and order node are configured to be moved to the sequencing grid for use in a trader-configured sequence.

10. The computer system of claim 7, wherein the operator intervention tools are configured to provide multiple operators on the computer user interface including at least one of a stop operator, a pause operator, a shotgun operator, a variable operator, and a prompt operator.

11. The computer system of claim 6, wherein an algorithm collection module provides selectable algorithms and destinations on the computer user interface.

\* \* \* \* \*